United States Patent
Matsumoto et al.

(10) Patent No.: US 6,611,187 B2
(45) Date of Patent: Aug. 26, 2003

(54) MAGNETIC CORE, COIL ASSEMBLY AND POWER SUPPLY CIRCUIT USING THE SAME

(75) Inventors: Hatsuo Matsumoto, Sendai (JP); Teruhiko Fujiwara, Sendai (JP); Hisao Nishino, Sendai (JP); Toru Ito, Miyagi (JP); Takao Yamada, Miyagi (JP); Masahiro Kondo, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/040,295

(22) Filed: Oct. 24, 2001

(65) Prior Publication Data

US 2002/0159277 A1 Oct. 31, 2002

(30) Foreign Application Priority Data

| Oct. 25, 2000 | (JP) | ......................................... | 2000-325860 |
| Nov. 10, 2000 | (JP) | ......................................... | 2000-343335 |
| May 31, 2001 | (JP) | ......................................... | 2001-165419 |

(51) Int. Cl.⁷ .......................... H01F 21/00; H01F 21/08
(52) U.S. Cl. ........................................ 336/110; 336/165
(58) Field of Search .................................. 323/222, 223, 323/233; 336/110, 155, 160, 165, 177, 178, 214, 218, 221

(56) References Cited

U.S. PATENT DOCUMENTS

| 6,051,902 A | * | 4/2000 | Ogino et al. .................. 310/154 |
| 6,356,179 B1 | * | 3/2002 | Yamada ....................... 336/175 |

FOREIGN PATENT DOCUMENTS

| EP | 0 255 051 A1 | 2/1988 |
| JP | 04-119604 | 4/1992 |
| JP | 05-047572 | 2/1993 |
| JP | 08-273960 | 10/1996 |
| JP | 10-070023 | 3/1998 |
| JP | 11-006038 | 1/1999 |
| JP | 11-214207 | 8/1999 |
| JP | 2000-096102 | 4/2000 |

* cited by examiner

Primary Examiner—Matthew V. Nguyen
(74) Attorney, Agent, or Firm—Frishauf, Holtz, Goodman & Chick, P.C.

(57) ABSTRACT

A magnetic core has an open magnetic path and includes a magnetic body forming the open magnetic path and having a soft magnetic property, and a permanent magnet at least at one end of the magnetic path of the magnetic body. A coil assembly includes the magnetic core having the open magnetic path. The magnetic core includes the magnetic body forming the open magnetic path and having the soft magnetic property. The coil assembly also includes the permanent magnet at least at one end of the magnetic path of the magnetic body, and at least one coil having at least one turn wound around the magnetic core. A power supply circuit includes the coil assembly. The coil assembly includes the magnetic core having the open magnetic path. The magnetic core includes the magnetic body forming the open magnetic path and having the soft magnetic property. The coil assembly further includes the permanent magnet at least at one end of the magnetic path of the magnetic body and at least one coil having at least one turn wound around the magnetic core. In the power supply circuit, a magnetic field is generated in response to an exciting current that flows through the coil of the coil assembly when an input voltage is applied, and is also applied to the magnetic body having the soft magnetic property. The magnetic field is opposite in direction to a magnetic field which is applied to the magnetic body having the soft magnetic property by the permanent magnet.

48 Claims, 17 Drawing Sheets

MAGNETIC CORE, COIL ASSEMBLY AND POWER SUPPLY CIRCUIT USING THE SAME

BACKGROUND OF THE INVENTION (1) Field of the Invention

The present invention relates to a magnetic core widely used in electronic equipment, and a coil assembly and a power supply circuit, each incorporating the magnetic core and, more particularly, to a technique for introducing compact, low-loss, simple-construction, high-efficiency and resource-saving designs into a magnetic core, a choke coil, and a transformer for use in a switching power supply.

(2) Description of the Related Art

To promote compact and high-efficiency designs, a switching technique has been introduced into power supplies. Insulator-type power supplies with a transformer incorporated therein have widely employed a single-ended forward DC-DC converter or a full-bridge DC-DC converter to obtain an output power much higher than 100 W.

Currently used switching power supplies have a reactive filter structure to comply with harmonic restriction rules which require that a drop in power factor due to distortions in currents and voltages to utility power source be controlled. Rather than using conventional choke-input rectification, the reactive filter structure rectifies a utility power input with a reactor at a subsequent stage grounded via a switching transistor. During an off state subsequent to the on state, electromagnetic energy stored in the reactor during the on state is released into an output capacitor. Thereafter, electromagnetic energy is fed to a DC-DC converter, which constitutes a main portion of the power supply.

The above-mentioned conventional art has the following serious problems in industrial applications.

When a conventional DC-DC converter providing a relatively large output is used, that employs the structure of a single-ended forward DC-DC converter to avoid a bulky structure. Accordingly, a smoothing choke coil is required to smooth the transfer of power during the on state and the off state of main transistors. This arrangement leads to a complex and less economical circuit design.

To obtain a high output power, a full-bridge structure is employed. In this way, the utilization of the transistors is heightened by taking advantage of the first quadrant and the third quadrant of the B-H characteristics of a transformer. Although a high output power results, four main transistors are required. Since two identical ones of the four transistors become concurrently conductive, the full-bridge structure suffers from substantial loss in economical and industrial points of view.

The conventional reactive filter circuit uses a reactor that is as bulky as an output transformer of the DC-DC converter at a subsequent stage connected to the reactor, and copper loss of the coil of the reactor lowers the efficiency of the entire power supply.

SUMMARY OF THE INVENTION

It is an object of the present invention to provide a magnetic core, a choke coil, and a transformer, used in a switching power supply, and featuring compact, low-loss, simple-construction, high-efficiency and resource-saving and economic designs.

It is another object of the present invention to provide a coil assembly employing the magnetic core.

It is still another object of the present invention to provide a power supply circuit employing the coil assembly.

According to one aspect of the present invention, there is provided a magnetic core which has an open magnetic path, and includes a magnetic body forming the open magnetic path and having a soft magnetic property, and a permanent magnet at least at one end of the magnetic path of the magnetic body.

According to another aspect of the present invention, there is provided a coil assembly which includes a magnetic core having an open magnetic path. The magnetic core includes a magnetic body forming the open magnetic path and having a soft magnetic property, and a permanent magnet at least at one end of the magnetic path of the magnetic body, and also includes at least one coil having at least one turn wound around the magnetic core.

According to still another aspect of the present invention, there is provided a power supply circuit which includes a coil assembly including a magnetic core having an open magnetic path. The magnetic core includes a magnetic body forming the open magnetic path and having a soft magnetic property, and a permanent magnet at least at one end of the magnetic path of the magnetic body, and also includes at least one coil having at least one turn wound around the magnetic core. In the power supply circuit, a magnetic field is generated in response to an exciting current that flows through the coil of the coil assembly when an input voltage is applied. The magnetic field is applied to the magnetic body having the soft magnetic property, and is opposite in direction to a magnetic field which is applied to the magnetic body having the soft magnetic property by the permanent magnet.

DESCRIPTION OF THE PREFERRED EMBODIMENTS

To help understand the present invention, a conventional art is described below with reference to FIGS. 1A, 1B, 1C, 2, 3, and 4 before the discussion of the embodiments of the present invention.

Switching power supplies have been widely used to implement compact and high-efficiency designs. To obtain an output power substantially above 100 W, an insulated-type power supply using a transformer in widespread use is an single-ended forward type DC-DC converter circuit shown in FIG. 2 and a full-bridge type DC-DC converter circuit shown in FIG. 3A.

Figure 1A:
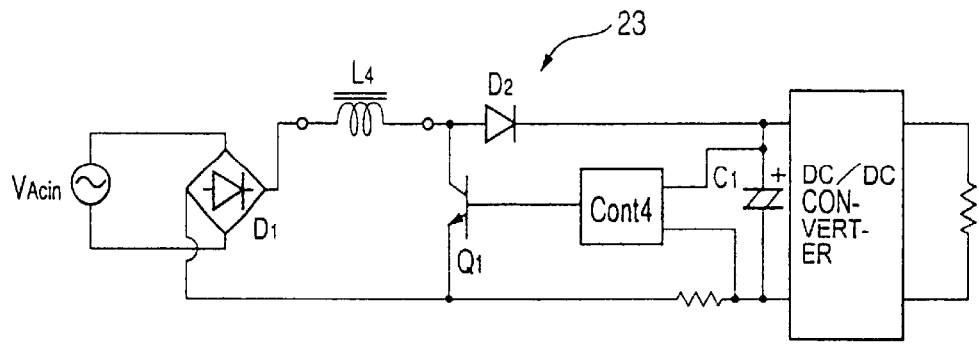
FIG. 1A is a circuit diagram showing the construction of a switching power supply having a conventional active filter.
Figure 1B:
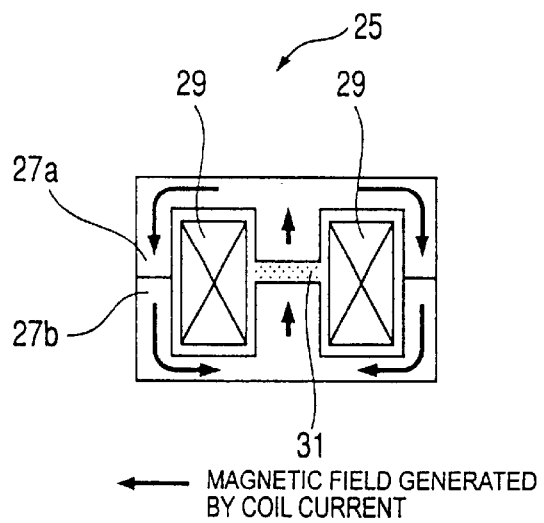
FIG. 1B is a cross-sectional view showing a transformer used in a conventional active filter.
Figure 1C:
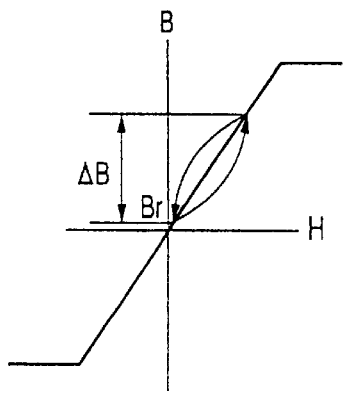
FIG. 1C illustrates B-H characteristics of the transformer used in the conventional active filter.

Currently used switching power supplies have a reactive filter structure to comply with harmonic restriction rules which require that a drop in power factor due to distortions in currents and voltages to utility power be controlled. Rather than using conventional choke-input rectification, the reactive filter structure rectifies a utility power input with a reactor L4 at a subsequent stage grounded via a switching transistor Q1 as shown in FIG. 1A. During an off state subsequent to the on state, electromagnetic energy stored in the reactor L4 during the on state is released into an output capacitor C1. Thereafter, electromagnetic energy is fed to a DC-DC converter, which constitutes a main portion of the power supply.

A control circuit CONT 4 controls the ratio of the on state of the switching transistor Q1 to the off state thereof so that a peak value of a current wave flowing through the reactor L4 is analog to a full-wave rectified voltage of a utility power source rectified through D1. Power supply characteristics with a power factor of approximately one thus result.

As already mentioned, however, the conventional art has the following disadvantage in industrial applications.

Figure 2:
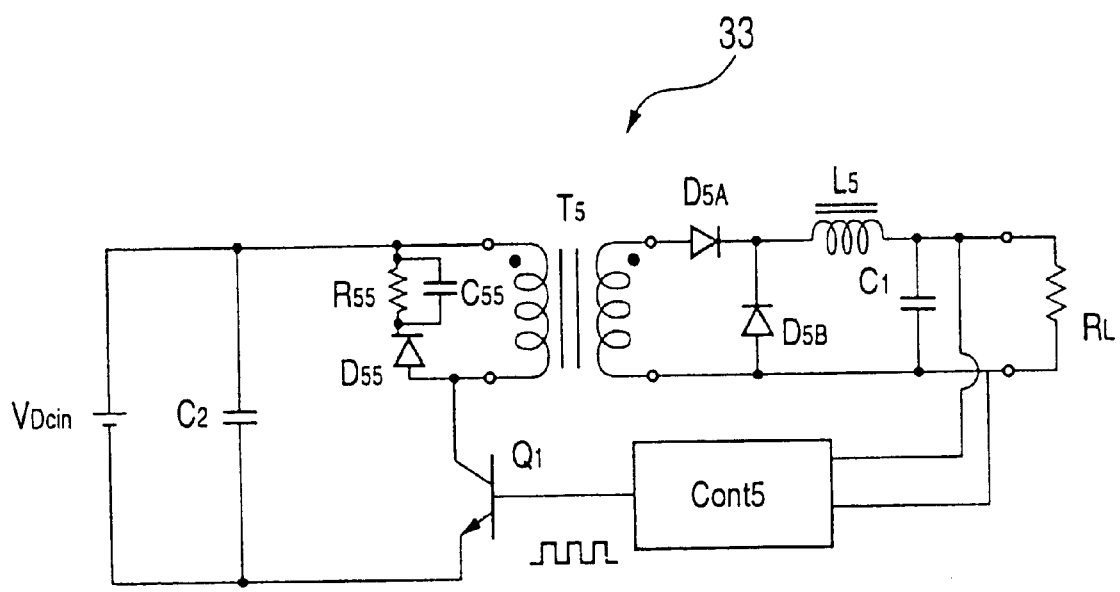
FIG. 2 is a circuit diagram showing a conventional single-ended forward DC-DC converter.

When a conventional DC-DC converter presenting a relatively large output is used, that converter needs to have a single-ended forward type converter to avoid a bulky design as shown in FIG. 2. As a result, a smoothing choke coil L5 is required to smooth the transfer of power during the on state and the off state of main transistors. This arrangement leads to a complex and less economical circuit design.

Figure 3A:
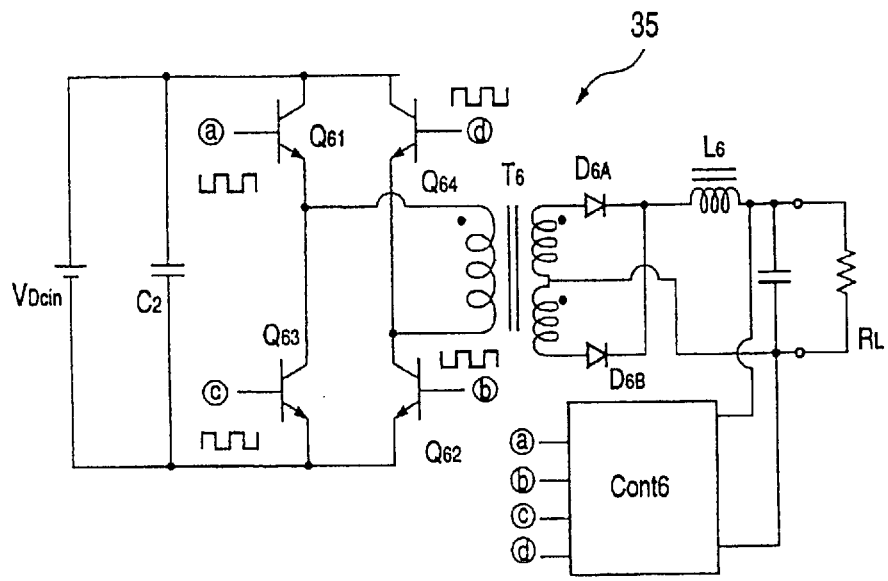
FIG. 3A is a circuit diagram showing a conventional full-bridge DC-DC converter.
Figure 3B:
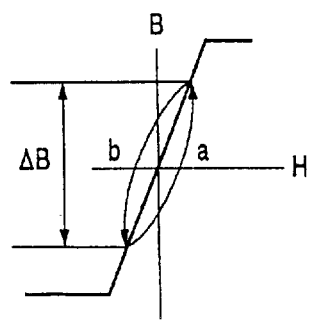
FIG. 3B illustrates B-H characteristics of the DC-DC converter shown in FIG. 3A.

To obtain a high output power, a full-bridge structure is employed as shown in FIG. 3A. In this way, the utilization of the transistors is heightened by taking advantage of the first quadrant and the third quadrant of the B-H characteristics of a transformer as shown in FIG. 3B. Although a high output power results, four main transistors are required. Since two identical ones of the four transistors, for example, Q61 and Q62, or Q63 and Q64, become conductive, the full-bridge structure suffers from substantial loss in economical and industrial points of view.

In the conventional reactive filter circuit shown in FIG. 1A, the reactor L4 becomes almost as bulky as the output transformer of the DC-DC converter at a subsequent stage connected to the reactor, and copper loss of the coil of the reactor lowers the efficiency of the entire power supply.

Figure 4A:
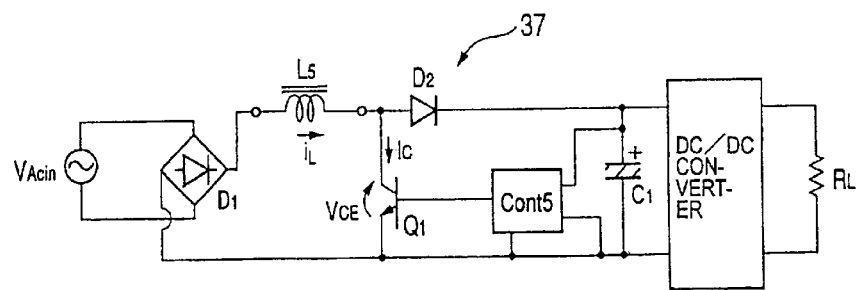
FIG. 4A is a circuit diagram showing a switching power supply having a conventional active filter.

As shown in FIG. 4A, a conventional switching power supply has a reactive filter structure to comply with harmonic restriction rules which require that a drop in power factor due to distortions in currents and voltages to utility power source input $V_{ACIN}$ be controlled. Rather than using conventional choke-input rectification to a utility power source input $V_{ACIN}$, the reactive filter structure rectifies a utility power source input with a reactor L5 at a subsequent stage grounded via a switching element (typically a transistor) Q1. During an off state subsequent to the on state, electromagnetic energy stored in the reactor L5 during the on state is released into an output capacitor C1. Thereafter, electromagnetic energy is fed to a DC-DC converter, which constitutes a main portion of the power supply.

A control circuit CONT 5 controls the ratio of the on state of the switching transistor Q1 to the off state thereof so that a peak value of a current wave flowing through the reactor L5 is analog to a full-wave rectified voltage $V_{CE}$ of a utility power source input $V_{ACIN}$ through D1. Power supply characteristics with a power factor of approximately one thus result.

Figure 4B:
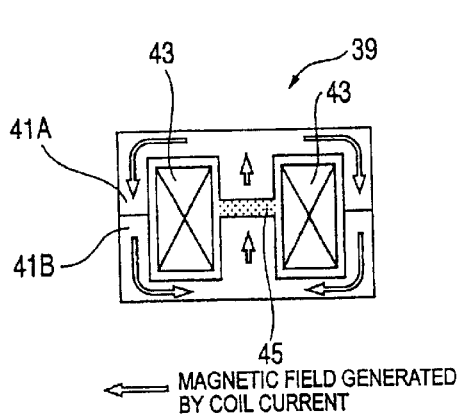
FIG. 4B is a cross-sectional view of a transformer used in the conventional active filter.
Figure 4C:
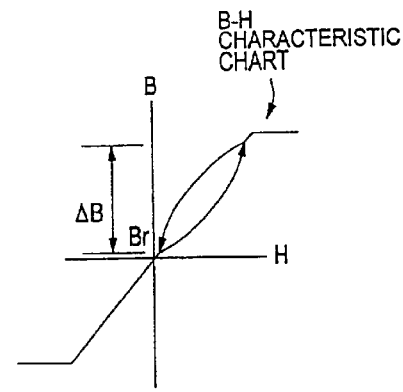
FIG. 4C illustrates B-H characteristics of the transformer used in the conventional active filter.
Figure 4D:
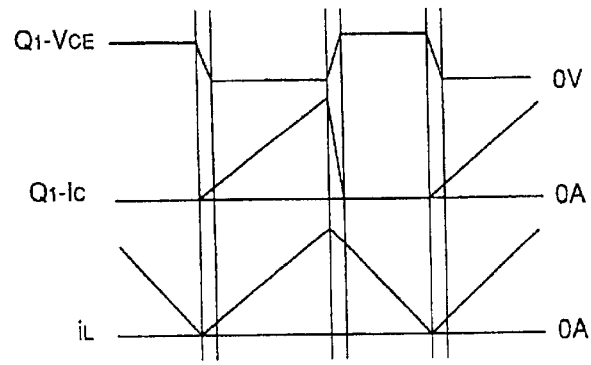
FIG. 4D is a waveform diagram showing main waveforms in accordance with the B-H characteristics of the transformer shown in FIG. 4C.

A reactor L5 shown in FIG. 4B used in an active filter circuit includes E-shaped or disklike magnetic cores 41A and 41B and a coil 43. The coil 43 is wound around inner segments of the magnetic cores 41A and 41B so that magnetic fluxes flow along the inner segments. An air gap 45 is arranged between opposing ends of the inner segments of the magnetic cores 41A and 41B. When the switching transistor Q1 is turned on, a coil current iL coming in from an input diode D1 generates magnetic fields in the magnetic cores 41A and 41B.

The conventional art has the following serious technical disadvantage in industrial applications. In the conventional reactive filter circuit shown in FIG. 4A, the reactor L5 becomes almost as bulky as the output transformer of the DC-DC converter at a subsequent stage connected to the reactor, and copper loss of the coil 43 of the reactor lowers the efficiency of the entire power supply.

When a conventional DC-DC converter presenting a relatively high output employs a single-ended flyback method, desired from the point of simple and economical construction, an exciting current becomes a sawtooth wave with the root-mean-square value thereof increased, thereby requiring a larger transformer. For this reason, the single-ended forward type converter shown in FIG. 2 is employed.

This arrangement leads to a complex and less economical circuit design.

To obtain an even higher output power, a full-bridge structure is employed as shown in FIG. 3A. In contrast to a half-wave excitation in a forward method shown in FIG. 2B, the utilization of the transformer T6 is heightened by taking advantage of the first quadrant and the third quadrant of the B-H characteristics of the transformer T6 as shown in FIG. 3B. Although a high output power results, four switching elements (typically transistors) are used. Since two identical ones of the four switching elements, for example, Q61 and Q62, or Q63 and Q64, become concurrently conductive in a switching operation, the full-bridge structure suffers from substantial loss in economical and industrial points of view.

One aspect of the present invention is discussed below.

The magnetic core of the present invention, manufactured of a magnetic body of a soft magnetic material, has a closed magnetic path with a permanent magnet arranged at least at one end of the magnetic path of the magnetic body. The magnetic core includes an air gap at least at one location in the magnetic path, and the permanent magnet having a specific resistivity of 1 Ω·cm or more and an intrinsic coercive force of 5 kOe or more in the air gap. The permanent magnet is a bonded magnet which contains rare-earth magnetic particles and a binder formed of a synthetic resin.

In the permanent magnet used in the magnetic core, the diameter of rare-earth magnetic particles is preferably not more than 150 μm.

A coil assembly of the present invention includes at least one coil having at least one turn that is wound around the magnetic core.

A power supply circuit of the present invention includes the coil assembly, in which a magnetic field, which is generated in response to an exciting current that flows through the coil of the coil assembly when an input voltage is applied, and which is applied to the magnetic body, is opposite in direction to a magnetic field which is applied to the magnetic body by the permanent magnet.

In the power supply circuit of the present invention, the magnetic core having an open magnetic path includes a magnetic body forming the open magnetic path and having a soft magnetic property, and a permanent magnet at least at one end of the magnetic path of the magnetic body. A coil assembly, such as a coil or a transformer, includes at least one coil having at least one turn that is wound around the magnetic core in a direction intersecting the magnetic path. A magnetic field is generated in response to an exciting current that flows an exciting coil through the coil of the coil assembly when an input voltage is applied. The magnetic field is applied to the magnetic body having the soft magnetic property, and is opposite in direction to a magnetic field which is applied to the magnetic body having the soft magnetic property by the permanent magnet.

In this arrangement, the magnetic body having soft magnetic property in a coil or a transformer, each of which are half-wave excited, is excited in the first quadrant in a B-H characteristic curve, and is biased beforehand toward the third quadrant by the permanent magnet. Since a residual flux density Br is substantially shifted to the third quadrant, an available flux density range ΔB is substantially expanded. This arrangement drastically reduces the number of turns around the magnetic core, thereby contributing to compact and low-loss designs in the coil assembly. The circuit arrangement would become complex if a high output power design were implemented in the conventional switching power supply. The circuit arrangement becomes substantially simple.

Description will be made as regards the magnetic core of the present invention, and the coil assembly and the power supply circuit incorporating the magnetic core below with reference to the drawings.

First Embodiment

Figure 5:
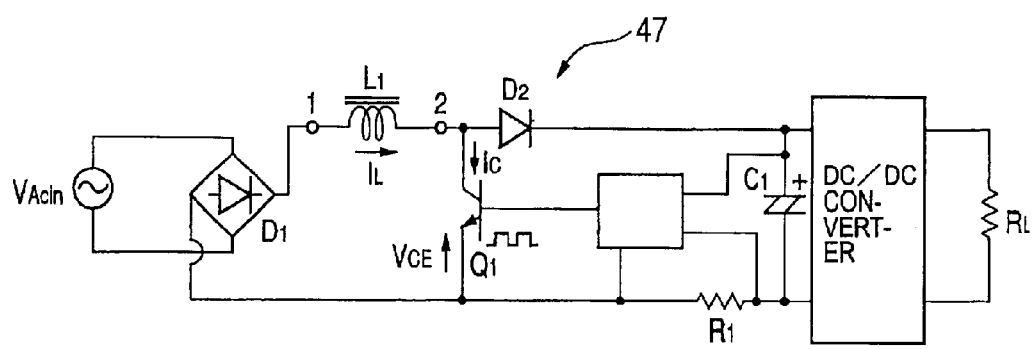
FIG. 5 is a circuit diagram showing a switching power supply having an active filter of the present invention.
Figure 6:
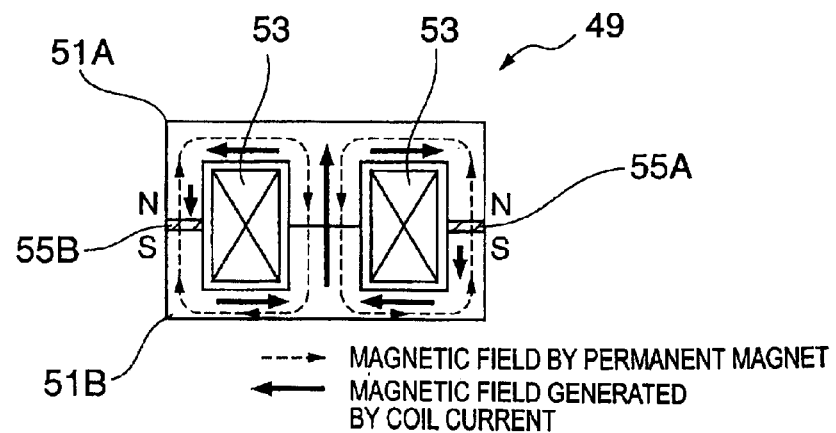
FIG. 6 is a cross-sectional view of a coil assembly incorporating the magnetic core of the present invention.
Figure 7:
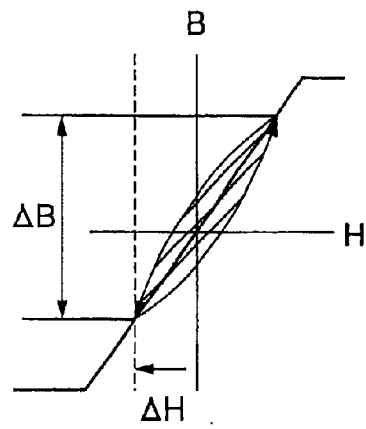
FIG. 7 illustrates B-H characteristics of the coil assembly incorporating the magnetic core of the present invention.

Referring to FIG. 5, a magnetic core of a first embodiment of the present invention and a coil assembly L1 are arranged as shown in a cross-sectional view of FIG. 6 as an active filter. A switching power supply 47 thus results.

Figure 8:
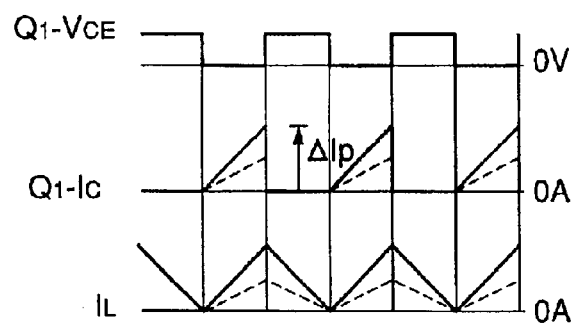
FIG. 8 is a waveform diagram of the operation of the switching power supply having the active filter of the present invention.

Referring to FIG. 6, the magnetic core and the coil assembly incorporating the magnetic core used in an active filter circuit of the present invention shown in FIG. 6 includes a pair of E-shaped or disklike magnetic cores 51A and 51B, fabricated of Mn—Zn ferrite, having a soft magnetic property, and a coil 53. The coil 43 is wound around inner segments of the magnetic cores 41A and 41B so that magnetic fluxes flow along the inner segments. Air gaps are respectively arranged between opposing ends of the outer segments of the magnetic cores 51A and 51B. When the switching transistor shown in FIG. 5 is turned on, a coil current $I_L$, shown in FIG. 8, generates magnetic fields in the magnetic cores 51A and 51B in directions opposite to the directions of magnetic fields generated by film-like permanent magnets 55A and 55B which are arranged in the respective air gaps of the magnetic cores.

Figure 9:
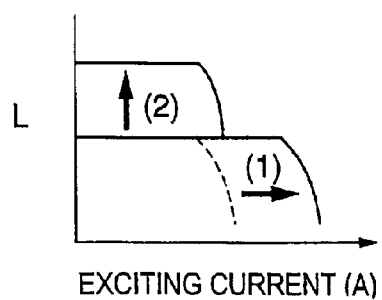
FIG. 9 is a characteristic diagram showing DC biased inductance characteristics of the magnetic core of the present invention and the coil assembly.

When the magnetic cores and the coil assembly of the present invention are used, the magnetic cores are biased to the third quadrant by a $\Delta H$ component by a film-like permanent magnets in a direction opposite to the direction of the magnetic field generated by a current flowing through the coil. A permissible range of the magnetic flux density $\Delta B$ caused by the voltage and current applied to the coil is thus expanded. As shown in DC biased inductance characteristics in response to a direct current superimposed exciting current flowing through the coil as shown in FIG. 9, given the same inductance, a superimposed current value is drastically increased with the magnetic cores having the same induction coefficient $A_L$ as represented by an arrow (1), in comparison with the characteristic of the conventional coil assembly represented by a broken line. Conversely, when the inductance coefficient $A_L$ is heightened by narrowing the air gap as represented by an arrow (2), inductance is drastically increased and superimposed current permissible value in the conventional coil assembly is assured.

The magnetic core and the coil assembly of the first embodiment of the present invention are incorporated in the active filter L1. Let f represent an operational frequency, and $\Delta Ip$ represent a peak value of a current flowing through the coil, and the output power P(W) contributing to a voltage rise of the active filter is expressed in the following equation:

$$P=(1/2)L(\Delta Ip)^2 \cdot f \qquad (1)$$

Given the magnetic core having the same size and the same frequency, the output power is quadrupled because $\Delta Ip$, i.e., an increase in the current permitted through the exciting coil is squared in equation (1).

Let Ve represent an effective volume of the magnetic core, and k represent a proportionality factor, and equation (1) is rewritten as follows:

$$P=(k/2)(\Delta B)^2 \cdot Ve \cdot f \qquad (2)$$

From equation (2), the magnetic core is reduced in volume while a high design value of $\Delta B$ is permitted. A decrease in copper loss resulting from the reduction of a number of turns provides a compact and highly efficient active filter in the switching power supply.

Second Embodiment

Figure 10A:
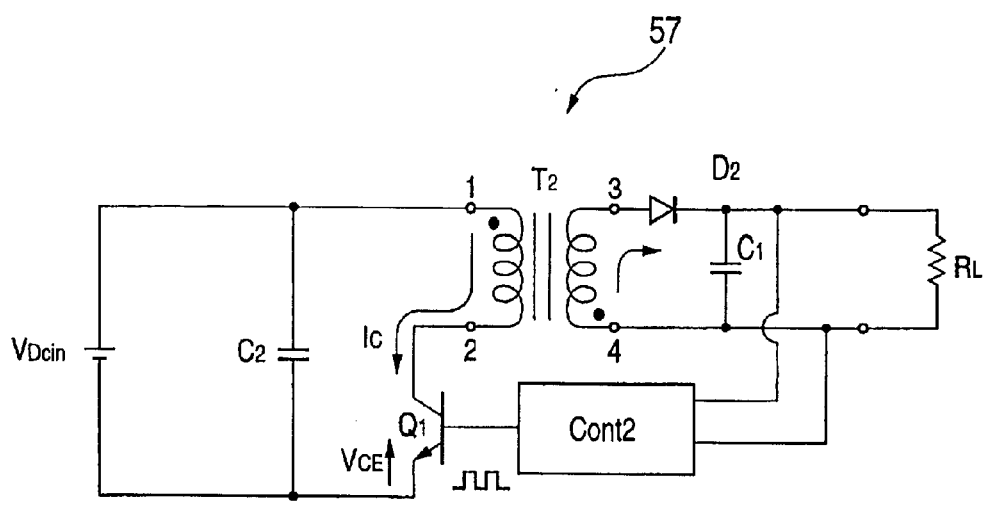
FIG. 10A is a circuit diagram showing a single-ended flyback DC-DC converter of the present invention.

Referring to FIG. 10A, a magnetic core of a second embodiment of the present invention, and a coil assembly and a power supply circuit, each incorporating the magnetic core, are applied to a single-ended flyback type DC-DC converter.

Figure 10B:
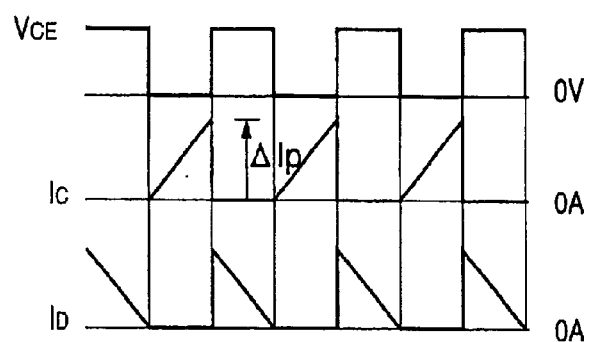
FIG. 10B is a waveform diagram showing main waveforms in the operation of the DC-DC converter shown in FIG. 10A.

FIG. 10B is a waveform diagram of main waveforms in the operation of the DC-DC converter.

An output transformer T2 includes a magnetic core having the same construction of the first embodiment shown in FIG. 6. The coil section thereof includes an output coil 1-2 and an output coil 3-4.

When a main transistor Q1 is turned on, a sawtooth current flows through an exciting coil as shown in FIG. 10B, and electromagnetic energy is charged. At the moment D1 is turned off, power is transferred to the output side of the converter through the output coil 3-4 and a diode D2. This operation is repeated in response to a command from a control circuit CONT 2.

Since the above-referenced magnetic core of the present invention and the coil assembly T2 employing the magnetic core are used, the output power $P_o(W)$ of the DC-DC converter shown in FIG. 10A is expressed by equation (1), namely, $$P_o=(1/2)L(\Delta Ip)^2 \cdot f$$

or equation (2), namely, $$P_o=(k/2)(\Delta B)^2 \cdot Ve \cdot f.$$

The present invention thus incorporates simple-structured, compact, and highly efficient designs even in the conventional DC-DC converter presenting a relatively high output power shown in FIG. 3A and FIG. 3B, and eliminates the need for the complex single-ended forward circuit arrangement including the choke coil L5 which typically fail to implement economical and compact designs.

Even when required power rating becomes high in the conventional full-bridge structure shown in FIG. 3, the present invention provides a simple, low-loss, and compact DC-DC converter with the utilization of the transformer core unchanged, without introducing a more complex circuit arrangement.

Third Embodiment

Figure 11:
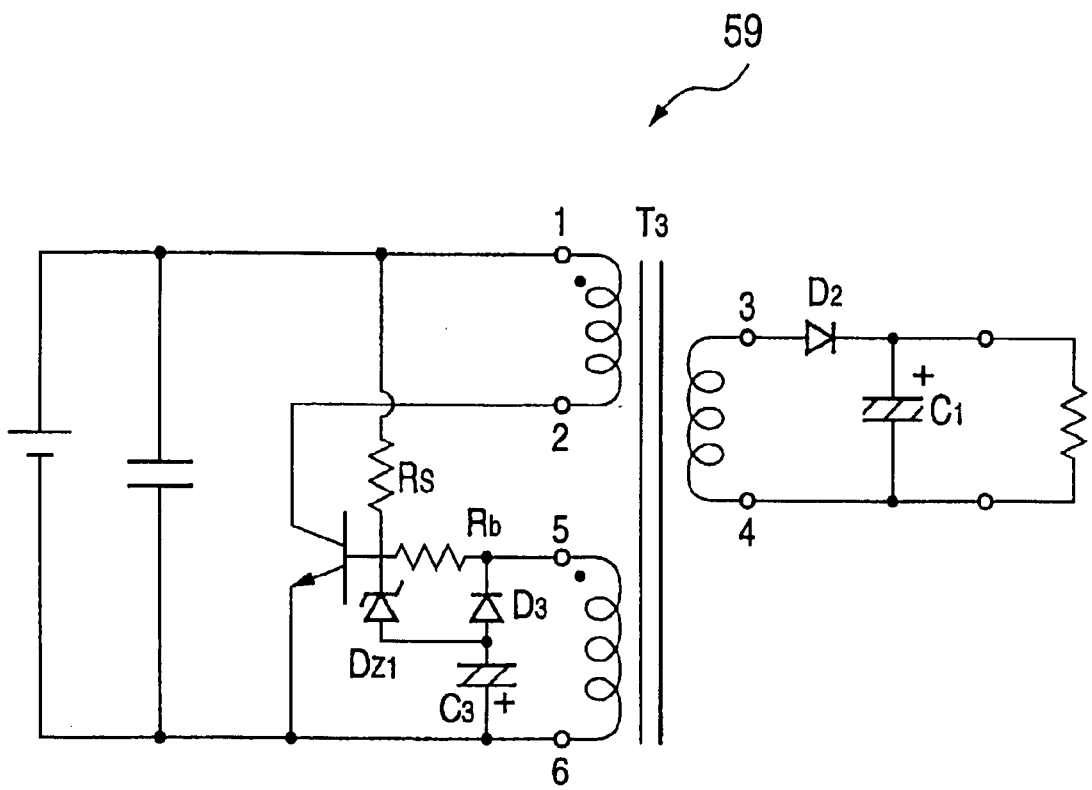
FIG. 11 is a circuit diagram showing an RCC converter of the present invention.

Referring to FIG. 11, a magnetic core of a third embodiment of the present invention, and a coil assembly and a power supply circuit, each employing the magnetic core are applied to an self-exciting RCC converter. A sheet-like permanent magnet shown in FIG. 6 biases an output transformer T3 in a direction opposite to a direction of a magnetic field that is generated by a current flowing through an exciting coil 1-2. The output across an output coil 3-4, which is transferred to a load side in a manner similar to that shown in FIG. 10B, is large in comparison with the conventional magnetic core and the coil assembly employing the conventional magnetic core, characteristics of which are represented by a dotted line. This arrangement accomplishes compact, high-power, and low-loss designs in the RCC converter.

In the magnetic core, and the coil assembly and the power supply circuit, each employing the magnetic core in accordance with the present invention, the magnetic core having an excellent core-loss characteristic as well as DC bias characteristics needs to be used in a simple and economical way. To this end, the characteristics of the sheet-like permanent magnet are important.

A magnetic body, such as Mn—Zn ferrite, having a soft magnetic property, and having coercive force less than 5 kOe (395 A/m) loses coercive force when a DC magnetic field is applied thereto. A permanent magnet material having coercive force higher than that, for example, an SmCo based magnetic material stably works. In an effort to prevent an increase in core loss, the particles of the magnetic material and a thermoplastic resin are kneaded, and formed in a sheet as a bonded magnet to control eddy currents. In this case, specific resistivity is set to be 1 Ω·cm and particle diameter of the power is set to be not more than 150 μm.

Compact and low-loss designs are implemented in a coil assembly, such as a magnetic core, a choke coil, a transformer, etc. used in a switching power supply by employing the magnetic core, the coil assembly, and the power supply circuit in accordance with the first through third embodiments of the present invention. The power supply circuit is particularly advantageous in industrial applications because of simple construction, high efficiency, and resource-saving features thereof.

Another aspect of the present invention is discussed below.

A magnetic core of the present invention includes a magnetic body forming an open magnetic path and having a soft magnetic property, and a permanent magnet at least at one end of the magnetic path of the magnetic body.

A coil assembly of the present invention includes a magnetic core, a permanent magnet, and at least one coil. The magnetic core has an open magnetic path, includes a magnetic body forming the open magnetic path and has a soft magnetic property. The permanent magnet is provided at least at one end of the magnetic path of the magnetic body. The at least one coil has at least one turn wound around the magnetic core.

A power supply circuit of the present invention includes a coil assembly including a magnetic core which has an open magnetic path and includes a magnetic body forming the open magnetic path and having a soft magnetic property. The magnetic body has a permanent magnet at least at one end of the magnetic path of the magnetic body and at least one coil having at least one turn wound around the magnetic core. In the coil assembly, a magnetic field is generated in response to an exciting current that flows through the coil of the coil assembly when an input voltage is applied, and is applied to the magnetic body having the soft magnetic property. The magnetic field is also opposite in direction to a magnetic field which is applied to the magnetic body having the soft magnetic property by the permanent magnet.

The coil assembly of the present invention includes the magnetic core having an open magnetic path including a magnetic body forming the open magnetic path and having a soft magnetic property, and a permanent magnet at least at one end of the magnetic path of the magnetic body, and at least one coil having at least one turn that is wound around the magnetic core in a direction intersecting to the magnetic path. In the coil assembly, a magnetic field is generated in response to an exciting current that flows through the coil of the coil assembly when an input voltage is applied to the coil of the coil assembly, and is applied to the magnetic body having the soft magnetic property. The magnetic field is also opposite in direction to a magnetic field which is applied to the magnetic body having the soft magnetic property by the permanent magnet.

In this arrangement, a half-wave excited coil or transformer with the magnetic body having a soft magnetic property magnetized in the magnetization direction in the first quadrant of the B-H characteristic curve is biased toward the third quadrant. The residual magnetic flux Br is shifted to the third quadrant, and the available magnetic flux range ΔB is thus substantially expanded. The number of turns wound around the magnetic core is significantly reduced. Compact and low-loss designs are thus implemented in the coil assembly.

Because of the aforementioned bias effect, the magnetic core and the coil assembly employing the magnetic core in accordance with the present invention make use the B-H loop in a wide range from the first quadrant to the third quadrant thereof even in the half-wave excited circuit. A single-ended flyback type converter having the simplest construction is designed to work with a trapezoidal-shaped current rather than a sawtooth-shaped current used in the aforementioned conventional art. The root-mean-square value of the current flowing through the coil is thus reduced to a level as low as that in the above-mentioned complex forward type converter or full-bridge type converter. Therefore, a high-power design is implemented in a switching power supply using a simple construction without complicating the circuit arrangement.

The power supply circuit has the following construction. At least one single coil is wound around a newly arranged small magnetic core for delaying a turn-off current of a switching element. Both ends of the coil is connected between an exciting coil and the switching element. A circuit including a parallel resonance capacitor is connected in parallel with the switching element at least during a turn-off period. A resulting simple-structured power supply circuit has a substantial drop in switching loss involved in crossing of currents and voltages during turn-on and turn-off of the switching element.

The magnetic core, and the coil assembly and the power supply circuit, each employing the magnetic core, are discussed below referring to the drawings.

Fourth Embodiment

Figure 12A:
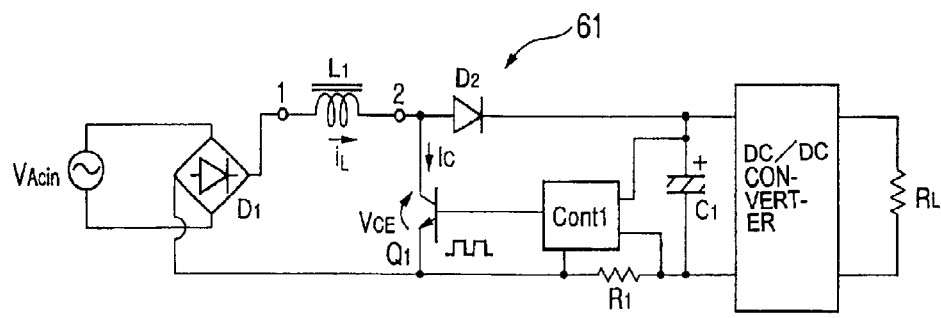
FIG. 12A is a circuit diagram showing a switching power supply having an active filter in accordance with a fourth embodiment of the present invention.
Figure 12B:
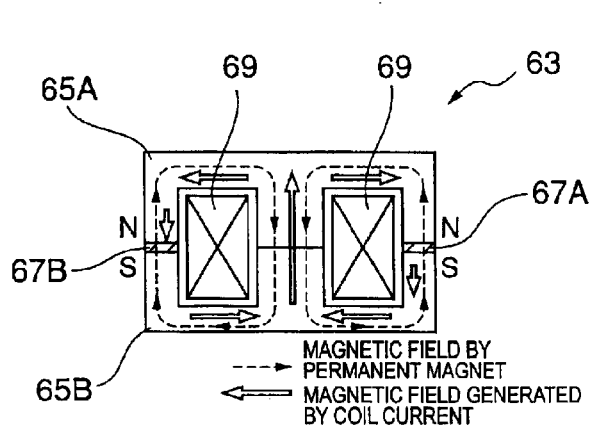
FIG. 12B is a cross-sectional view showing a coil assembly incorporating the magnetic core of the switching power supply shown in FIG. 12A.
Figure 12C:
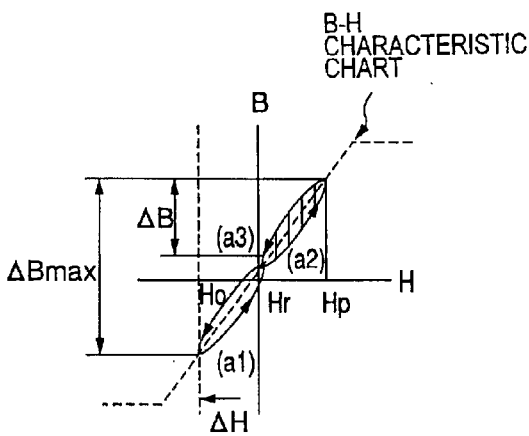
FIG. 12C illustrates operational B-H characteristics of the coil assembly incorporating the magnetic core shown in FIG. 12A.

Referring to FIG. 12B, a coil 69 is wound around inner segments of a pair of E-shaped or disk-like magnetic cores 65A and 65B, fabricated of Mn—Zn ferrite, and having a soft magnetic property so that magnetic fields flow in the center portions. Air gaps are respectively arranged between facing ends of outer segments of the magnetic cores 65A and 65B.

An active filter circuit shown in FIG. 12A includes a coil assembly L1, a switching element (typically a transistor) Q1, a control circuit CONT 1, diodes D1 and D2, a capacitor C1, and resistors R1 and R2.

The magnetic cores 65A and 65B and the coil assembly L1 incorporating the magnetic cores 65A and 65B in the active filter circuit include film-like permanent magnets 67A and 67B in the air gaps at the junction portions of the magnetic cores 65A and 65B. The permanent magnets 67A and 67B apply magnetic fields in a direction opposite to a direction of the magnetic fields generated in the magnetic cores 65A and 65B when a coil current iL flows from an input terminal 1 in response to the conduction of the switching element (typically the transistor) Q1. Specifically, each of the magnetic cores 65A and 65B has the magnetic bodies fabricated of a soft magnetic property and has an open magnetic path, respectively. The magnetic cores also include permanent magnets 67A and 67B at least one end of the respective magnetic paths, and at least a single coil 69 having at least a single turn is wound around the inner segments of the magnetic cores 65A and 65b.

With the magnetic cores 65A and 65B and the coil assembly L1 of the present invention used, the film-like permanent magnets 67A and 67B bias the magnetic cores 65A and 65B by a ΔH toward the third quadrant in a direction opposite to a direction of the magnetic fields that are generated by a current flowing through the coil. The permissible range ΔB of magnetic flux in response to the current and voltage applied to the coil is expanded as shown. The characteristics of the conventional coil assembly is represented by a dotted line as the DC biased inductance characteristic curve in response to an exciting current flowing through the coil in FIG. 12E. The magnetic cores 65A and 65B having the same inductance coefficient AL substantially increases superimposed current as represented by an arrow (1) shown in FIG. 12E, given the same value of inductance. Conversely, if the AL value is increased by narrowing the air gap as represented by an arrow (2) in FIG. 12E, inductance is greatly increased, thereby assuring the permissible conventional superimposed current value.

Figure 12D:
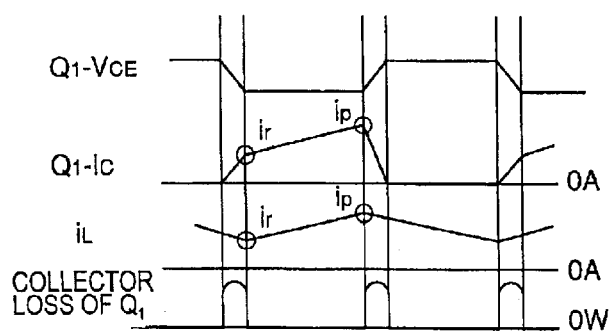
FIG. 12D is a waveform diagram showing main waveforms in accordance with the operational B-H characteristics of the coil assembly shown in FIG. 12C.
Figure 12E:
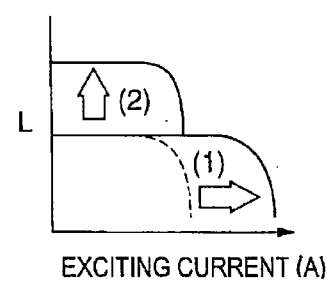
FIG. 12E is a diagram illustrating DC biased inductance of the coil assembly incorporating the magnetic core shown in FIG. 12A.

When the magnetic core and the coil assembly 63 of the fourth embodiment of the present invention are applied to the coil assembly L1 of the active filter, the output power $P_o(W)$ contributing to a voltage rise of the active filter is expressed as follows:

$$P_o = (1/2)L\{(ip)^2 - (ir)^2\}f \qquad (3)$$

where f is an operational frequency, and ip and ir are peak values shown in FIG. 12D. Given the magnetic cores 65A and 65B having the same size and the same frequency, the output power is quadrupled because of the square law to an increase in the exciting current in equation (3).

Let Ve represent an effective volume of the magnetic cores 65A and 65B, k represent a proportionality factor, $\Delta B_{max}$ represent an exciting magnetic flux range, and equation (3) is rewritten as $$P_o = (k/2)(\Delta B_{max})^2 \cdot Ve \cdot f.$$

The magnetic core is reduced in volume while a high design value of ΔB is permitted. A decrease in copper loss resulting from the reduction of a number of turns provides a compact and highly efficient active filter in the switching power supply.

Fifth Embodiment

Figure 13A:
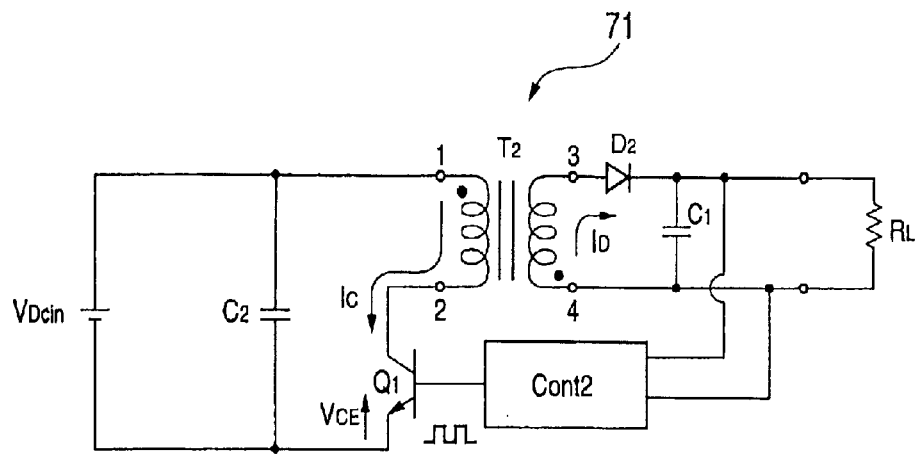
FIG. 13A is a circuit diagram showing the a single-ended flyback DC-DC converter in accordance with a fifth embodiment of the present invention.

Referring to FIG. 13A, a magnetic core of a fifth embodiment of the present invention, a coil assembly (i.e., a transformer) and a power supply circuit, each employing the magnetic core are applied to a single-ended flyback type DC-DC converter 71. Referring to FIG. 13A, the DC-DC converter includes a transformer T2, a switching element (typically a transistor) Q1, a control circuit CONT 2, a diode D2, capacitors C1 and C2, and a resistor RL.

Figure 13B:
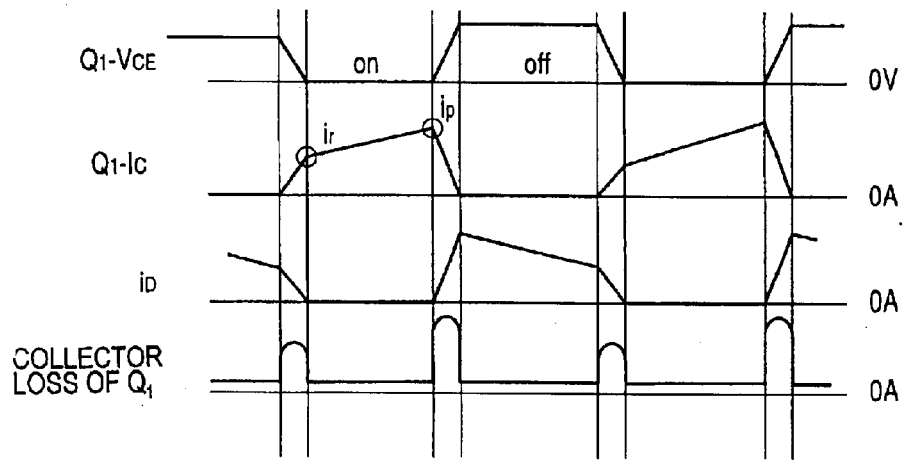
FIG. 13B is a waveform diagram of main waveforms in the operation of the single-ended flyback DC-DC converter shown in FIG. 13A.
Figure 13C:
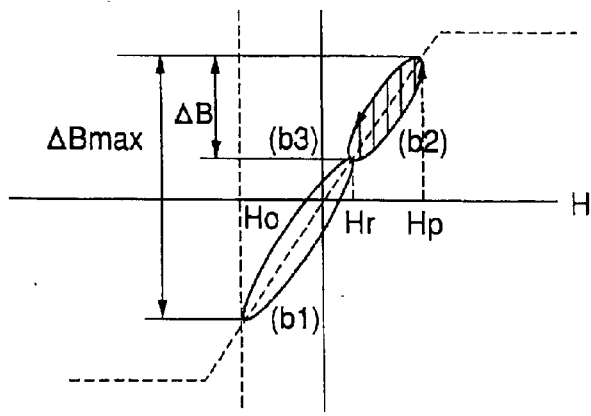
FIG. 13C illustrates operational B-H characteristics of the coil assembly incorporating the magnetic core shown in FIG. 13A.

The transformer T2 includes the same magnetic core as that of the fourth embodiment shown in FIG. 12B and includes an output coil 1-2 and an output coil 3-4. Inductance of the exciting coil is sufficiently high. When the switching element Q1 is turned on, a trapezoidal current flows through the exciting coil as shown in FIG. 13B, while electromagnetic energy is charged. When the switching element Q1 is turned off, a trapezoidal-wave output current flows through the output coil 3-4 and the diode D2. In this way, with the trapezoidal-wave output current flowing, power transfer is repeated in response to a command from the control circuit CONT 2.

Like the fourth embodiment, the single-ended flyback type DC-DC converter 71 shown in FIG. 13A provides an output power $P_o(W)$, where $$P_o = (1/2) L\{(ip)^2 - (ir)^2\}f$$

or $$P_o = (k/2)(\Delta B_{max})2 \cdot Ve \cdot f.$$

This arrangement eliminates the need for employing the conventional single-ended forward structure or the conventional full-bridge structure, known for its complex circuit arrangement, in a high-power DC-DC converter. A single-ended flyback type converter, which features high utilization of the transformer T2 and sufficiently reduces the root-mean-square value of a current flowing through the coil, implements simple, compact, and highly efficient designs without losing economical benefits.

Sixth Embodiment

Figure 14A:
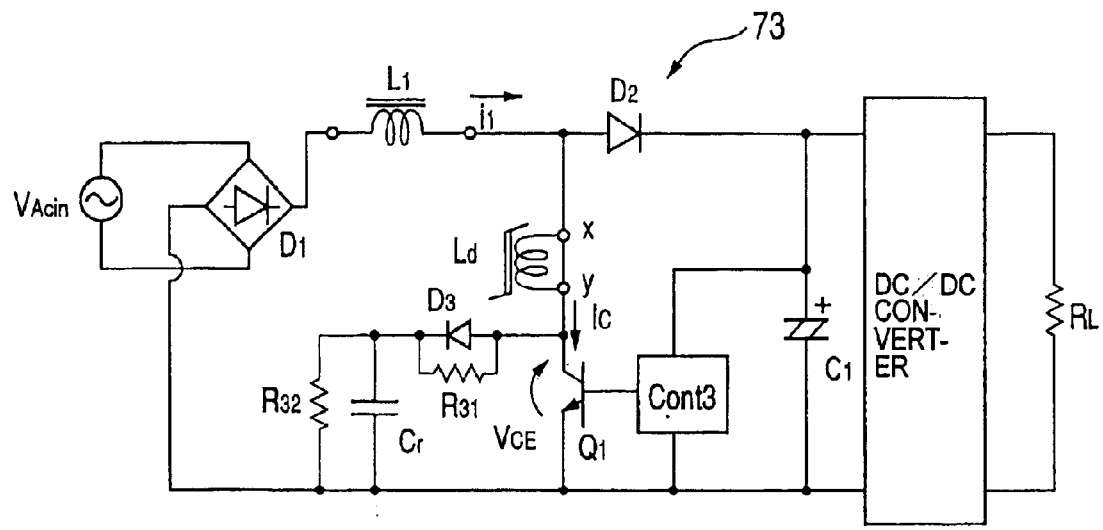
FIG. 14A is a circuit diagram showing a switching power supply incorporating an active filter in accordance with a sixth embodiment of the present invention.
Figure 14B:
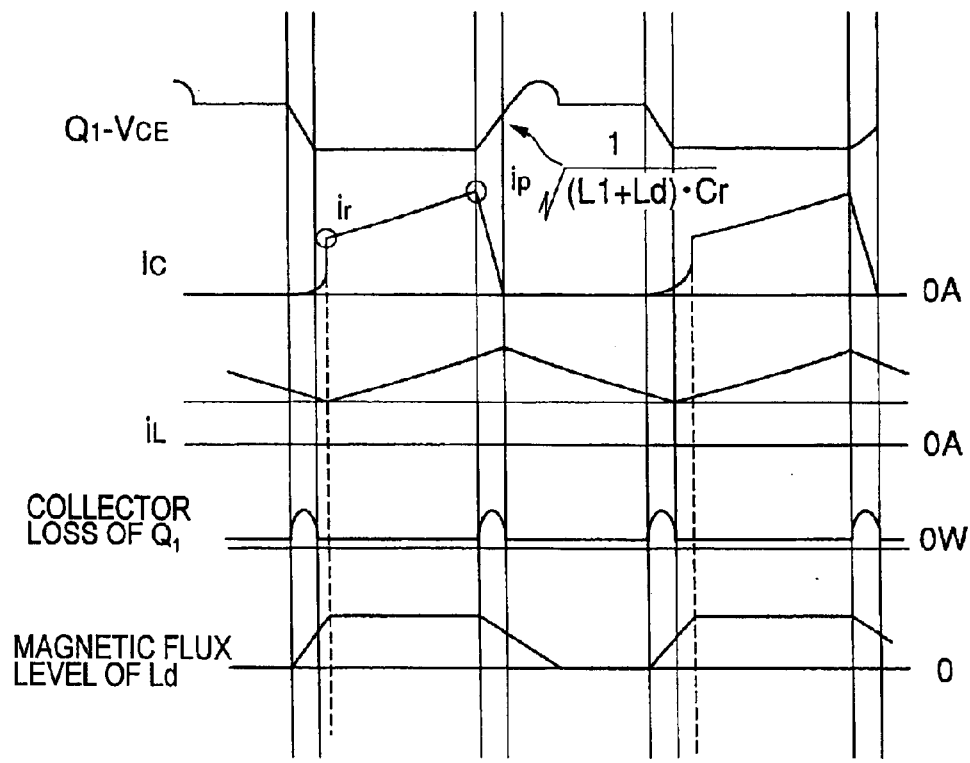
FIG. 14B is a waveform diagram showing main waveforms in the operation of the switching power supply shown in FIG. 14A.

Referring to FIG. 14A, a magnetic core of a sixth embodiment of the present invention, and a coil assembly (a reactor) and a power supply circuit, each employing the magnetic core are applied to an active filter 73 which has been discussed in connection with the fourth embodiment. The sixth embodiment substantially reduces loss in a switching element. FIG. 14B is a waveform diagram of main waveforms in the operation of the active filter.

The active filter shown in FIG. 14A includes a reactor L1, a switching element (typically a transistor) Q1, a control circuit CONT 3, diodes D1, D2, and D3, capacitors Cr and C1, resistors RL, R31, and R32, and a saturable coil Ld.

To provide a high-output power, a trapezoidal-wave current, rather than a sawtooth-wave current, is allowed to flow through the switching element. This arrangement reduces the root-mean-square value of a current flowing through the reactor, thereby lowering loss involved in the reactor. But cross-current loss of the switching element itself increases at the turn-on of the switching element. For this reason, during the turn-on period of the switching element Q1, a coil x-y of a small number of turns is wound around a newly arranged, small magnetic core for a delay function, forming the saturable coil Ld. The saturable coil Ld is serially connected between the exciting coil of the transformer and the switching element Q1. The capacitor Cr resonates in parallel with the switching element Q1 during the turn-off period of the switching element Q1.

During the turn-on period of the switching element Q1, the exciting current flows through the switching element Q1 with the saturable coil Ld in a non-saturated state. When the saturable coil Ld reaches a saturated state, the exciting current is conducted through the reactor L1. Cross-current loss becomes extremely small.

During the turn-off period of the switching element Q1, the sum of inductances of the reactor L1 and the saturable coil Ld and capacitance of capacitor Cr start parallel resonance through the diode D3. The voltage of the switching element Q1 rises under the condition of natural frequency $1/\{(L1+Ld)Cr\}^{1/2}$. Similarly, cross-current loss becomes small.

The diode D3, connected in parallel with a resistor R31, is included in the parallel resonating circuit, and prevents an increase in cross-current loss by immediately discharging a charge stored in the capacitor Cr when the switching element Q1 is turned on.

The active filter receiving a utility power source voltage $V_{ACIN}$ must use a fast recovery diode for the diode D2. In the conventional art, the recover period of the diode D2 overlaps the turn-on period of the switching element Q1. A large penetrating current flows back from the output side to the switching element Q1, thereby reducing efficiency and causing strong EMI. The arrangement of the present invention blocks the penetrating current by the saturable reactor Ld. A high-efficiency and low-noise active filter results, presenting a large industrial benefit.

Seventh Embodiment

Figure 15A:
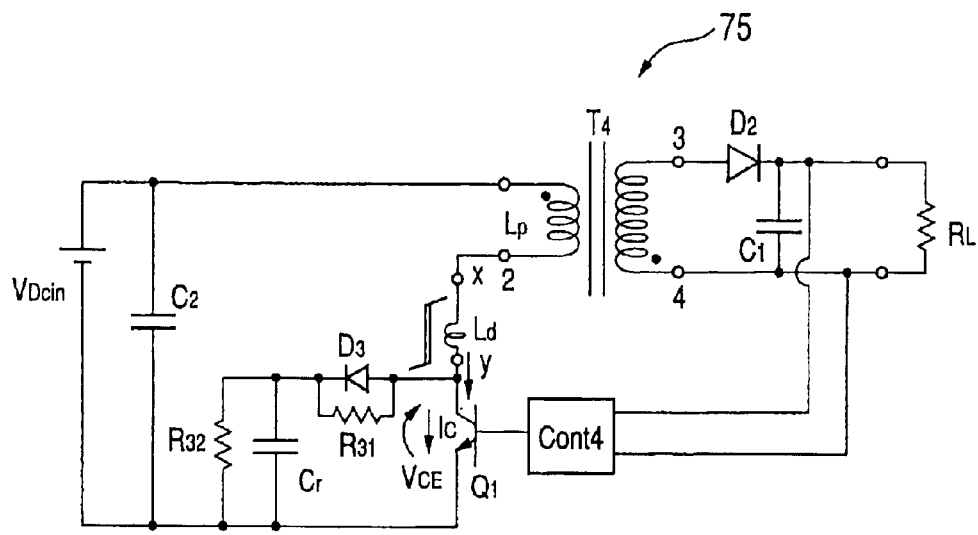
FIG. 15A is a circuit diagram showing a magnetic core of a seventh embodiment of the present invention, and a coil assembly incorporating the magnetic core, and a power supply incorporating the coil assembly.
Figure 15B:
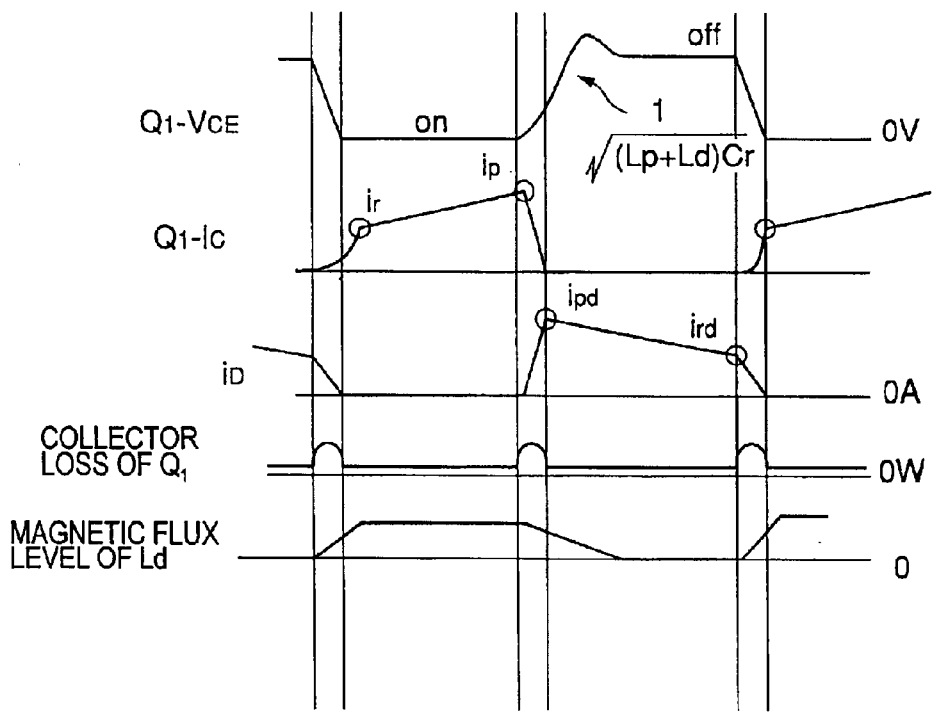
FIG. 15B is a waveform diagram of main waveforms in the operation of the power supply shown in FIG. 13A.

Referring to FIG. 15A, a magnetic core of a seventh embodiment of the present invention, and a coil assembly (a transformer) and a power supply circuit, each employing the magnetic core are applied to a single-ended flyback type converter 75 which has been discussed in connection with the fourth embodiment. The seventh embodiment substantially reduces loss in a switching element. FIG. 15B is a waveform diagram of main waveforms in the operation of the converter. The single-ended flyback type converter 75 includes a transformer T4, a switching element (typically a transistor) Q1, a control circuit CONT 4, diodes D2 and D3, capacitors Cr, C1, and C2, resistors RL, R31, and R32, and a saturable coil Ld.

Although a current flowing through the coil of the transformer has a trapezoidal wave to obtain a high output power like in the sixth embodiment, the cross-current loss in the switching element Q1 is substantially reduced because the saturable coil Ld for delaying and the capacitor Cr for parallel resonance are employed.

Since the single-ended flyback type converter includes the magnetic core of the present invention and the transformer T4 employing the magnetic core, inductance of the exciting coil becomes high within the above-mentioned wide operation range of magnetic flux. This arrangement eliminates the need for employing the conventional single-ended forward structure or the conventional full-bridge structure, known for its complex circuit arrangement, in a high-power DC-DC converter. A single-ended flyback type converter, which features high utilization of the transformer and sufficiently reduces the root-mean-square value of a current flowing through the coil, implements simple, compact, and highly efficient designs without losing economical benefits.

In the magnetic cores 65A and 65B, and the coil assembly and the power supply circuit, each employing the magnetic core in accordance with the present invention, magnetic cores 65A and 65B having an excellent core-loss characteristic as well as DC biasing feature need to be used in a simple and economical way. To this end, the characteristics of the sheet-like permanent magnets 67A and 67B are important.

Each of the magnetic cores 65A and 65B has an air gap at least at one location in the magnetic path thereof, and the permanent magnets 67A and 67B having a specific resistivity of 1 Ω·cm or more and an intrinsic coercive force of 395 kA/m or more in the air gap.

A magnetic body, such as Mn—Zn ferrite, having a soft magnetic property, and having coercive force less than 5 kOe (395 A/m) loses coercive force when a DC magnetic field is applied thereto. A permanent magnet material having coercive force higher than that, for example, an SmCo based magnetic material stably works. In an effort to prevent an increase in core loss, the particles of the magnetic material and a thermoplastic resin are kneaded, and formed in a sheet as a bonded magnet to control eddy currents. In this case, specific resistivity is set to be 1 Ω·cm or more and particle diameter of the magnetic particles is set to be not more than 150 μm.

The permanent magnets 67A and 67B are bonded magnets which contain rare-earth magnetic particles and a binder formed of a synthetic resin, and the rare-earth magnetic particles used in the bonded magnets have a diameter of 150 μm or less.

As described above, in the magnetic core according to one of the fourth through seventh embodiments of the present invention, the coil assembly and the power supply circuit, each employing the magnetic core, the magnetic core having the open magnetic path includes the magnetic body forming the open magnetic path and having the soft magnetic property, and the permanent magnet at least at one end of the magnetic path of the magnetic body. The coil assembly, such as a coil or a transformer, includes at least one coil having at least one turn that is wound around the magnetic core in a direction intersecting the magnetic path. The magnetic field, which is generated in response to the exciting current that flows through the exciting coil of the coil assembly when an input voltage is applied, and which is applied to the magnetic body having the soft magnetic property, is opposite in direction to the magnetic field which is applied to the magnetic body having the soft magnetic property by the permanent magnet.

In this arrangement, the magnetic body having soft magnetic property in a coil or a transformer, half-wave excited, which is excited in the first quadrant in a B-H characteristic curve, is biased toward the third quadrant by the permanent magnet. Since a residual flux density Br is shifted to the third quadrant, an available flux density range ΔB is substantially expanded. This arrangement drastically reduces the number of turns around the magnetic core, thereby contributing to implementation of compact and low-loss designs in the coil assembly.

Because of the aforementioned bias effect, the magnetic core and the coil assembly employing the magnetic core in accordance with the present invention make use the B-H loop in a wide range from the first quadrant to the third quadrant thereof even in the half-wave excited circuit. A single-ended flyback type converter having the simplest construction is designed to work with a trapezoidal-shaped current rather than a sawtooth-shaped current used in the aforementioned conventional art. The root-mean-square value of the current flowing through the coil is thus reduced to a level as low as that in the above-mentioned complex forward type converter or full-bridge type converter. Therefore, a high-power design is implemented in a switching power supply using a simple construction without complicating the circuit arrangement.

A power supply circuit has the following construction. At least one single coil is wound around a newly arranged small magnetic core for delaying a turn-off current of a switching element. Both ends of the coil of the magnetic core is connected between an exciting coil and the switching element. A circuit including a parallel resonance capacitor is connected in parallel with the switching element at least during a turn-off period. A resulting simple-structured power supply circuit has a substantial drop in switching loss involved in crossing of currents and voltages during turn-on and turn-off of the switching element.

In accordance with the fourth through seventh embodiments of the present invention, the coil assembly, such as a magnetic core, a choke coil, a transformer, used in a switching power supply becomes substantially compact and has a low-loss property. The power supply circuit is particularly advantageous in industrial applications because of simple construction, high efficiency, and resource-saving features thereof.

Another aspect of the present invention is specifically discussed.

A magnetic core of the present invention having a closed magnetic path includes a magnetic body forming the closed magnetic path and having a soft magnetic property, and a permanent magnet arranged in an air gap at least at one location.

A coil assembly of the present invention includes a magnetic core having a closed magnetic path, including a magnetic body forming the closed magnetic path and having a soft magnetic property, and a permanent magnet at least in an air gap at least at one location, and at least one coil having at least one turn wound around the magnetic core.

A power supply circuit of the present invention includes the coil assembly, wherein a magnetic field, which is generated in response to an exciting current that flows when an input voltage is applied to an exciting coil is opposite in direction to a magnetic field which is generated by the permanent magnet.

An inductance assembly of the present invention includes a permanent magnet which is manufactured by dispersing rare-earth magnetic particles in a synthetic resin, wherein the synthetic resin is at least one resin selected from the group consisting of a polyamide-imide resin, a polyimide resin, an epoxy resin, a polyphenylene sulfide resin, a silicone resin, a polyester resin, an aromatic polyamide resin, and a liquid-crystal polymer and wherein the rare-earth magnetic particle has an intrinsic coercive force of 790 kA/m (10 kOe) or more, a temperature Tc of 500° C. or higher, and a particle diameter falling within a range of 2.5 to 25 μm with a maximum diameter of 50 μm. The rare-earth magnetic particles are coated with at least one metal or the alloy of the one metal selected from the group consisting of Zn, Al, Bi, Ga, In, Mg, Pb, Sb, and Sn. The particles have thus specific resistivity of 0.1 Ω·cm or more, and the content of the synthetic resin is 30 or more volume percent.

The composition of the rare-earth magnetic particles is preferably

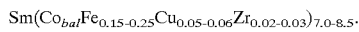

$Sm(Co_{bal}Fe_{0.15-0.25}Cu_{0.05-0.06}Zr_{0.02-0.03})_{7.0-8.5}$.

The rare-earth magnetic particles may be coated with inorganic glass having a softening point falling within a range of from 220° C. to 550° C., and the metal such as Zn or the alloy thereof coating the rare-earth magnetic particles may be in turn coated with a non-metallic inorganic compound having a melting point of 300° C. or higher.

The content of the coating of the rare-earth magnetic particles, such as the metal or the alloy thereof, inorganic glass, a metal or an alloy thereof, and a non-metallic compound is preferably in an amount from 0.1 to 10 volume percent.

When the permanent magnet is manufactured, the rare-earth magnetic particles are made magnetically anisotropic by aligning the magnetic particles in the direction of thickness of the core in a magnetic field.

Preferably, a magnetizing magnetic field of the permanent magnet is 2.5 T or more, and the mean irregularity Ra of the center line of the permanent magnet is 10 μm or less.

The present invention will now be discussed in detail. A coil assembly of the present invention is manufactured by winding at least one coil around a magnetic core in a direction intersecting the direction of a magnetic path of a magnetic core, wherein the magnetic core, manufactured of a soft magnetic material, has a closed magnetic path with a permanent magnet arranged at least in an air gap at least at one location of the magnetic path. A magnetic field, which is generated in response to an exciting current that flows when an input voltage is applied to the coil of the coil assembly, is opposite in direction to a magnetic field which is generated by the permanent magnet.

In this arrangement, a half-wave excited coil or transformer with the magnetic body having a soft magnetic property magnetized in the magnetization direction in the first quadrant of the B-H characteristic curve is biased toward the third quadrant. The residual magnetic flux Br is shifted to the third quadrant, and the available magnetic flux range ΔB is thus substantially expanded. The number of turns wound around the magnetic core is significantly reduced. Compact and low-loss designs are thus implemented in the coil assembly.

Because of the aforementioned bias effect, the magnetic core and the coil assembly employing the magnetic core in accordance with the present invention make use the B-H loop in a wide range from the first quadrant to the third quadrant thereof even in the half-wave excited circuit. A single-ended flyback type converter having the simplest construction is designed to work with a trapezoidal-shaped current rather than a sawtooth-shaped current used in the aforementioned conventional art. The root-mean-square value of the current flowing through the coil is thus reduced to a level as low as that in the above-mentioned complex forward type converter or full-bridge type converter. Therefore, a high-power design is implemented in a switching power supply using a simple construction without complicating the circuit arrangement.

A power supply circuit has the following construction. At least one single coil is wound around a newly arranged small magnetic core for delaying a turn-off current of a switching element. Both ends of the coil is connected between the exciting coil and the switching element. A circuit including a parallel resonance capacitor is connected in parallel with the switching element at least during a turn-off period. A resulting simple-structured power supply circuit has a substantial drop in switching loss involved in crossing of currents and voltages during turn-on and turn-off of the switching element.

Since SmCo based magnetic particles, having a high Tc (Curie temperature) and a high iHc (coercive force), are used for the permanent magnet, the permanent magnet is free from thermal demagnetization even under heated state during a reflow soldering process, for example. The permanent magnet maintains the initial characteristics thereof without losing coercive force and without being demagnetized even when a DC magnetic field by an excessive current is applied.

Furthermore, the permanent magnet is free from demagnetization due to oxidation process with time because the surface of the magnetic particles of the permanent magnet is coated with a metal such as Zn.

A high specific resistivity is accomplished by kneading the magnetic particles and the resin with the resin volume percent of 30% or more. Eddy current loss in the permanent magnet is thus substantially reduced.

Further embodiments of the present invention are described below referring to the drawings.

Eighth Embodiment

Figure 16A:
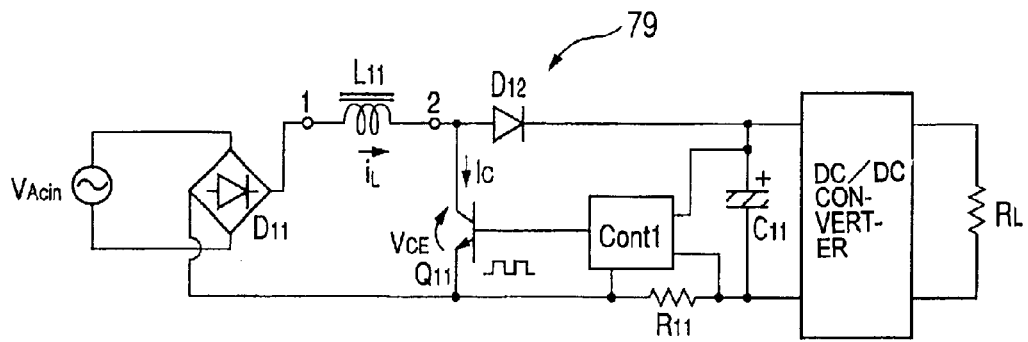
FIG. 16A is a circuit diagram illustrating a switching power supply incorporating an active filter in accordance with an eighth embodiment of the present invention.
Figure 16B:
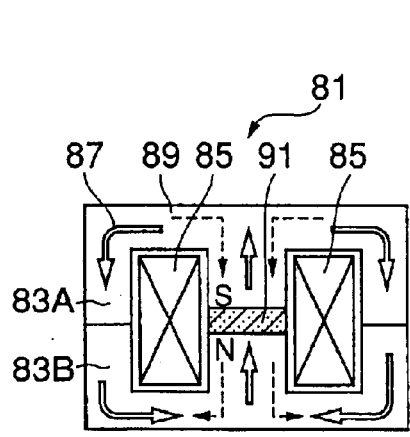
FIG. 16B is a cross-sectional view of a coil assembly incorporating the magnetic core shown in FIG. 16A.

Referring to FIG. 16B, a coil 85 is wound around inner segments of a pair of E-shaped or disk-like magnetic cores 83A and 83B, fabricated of Mn—Zn ferrite, and having a soft magnetic property so that magnetic fields flow in the center portions. An air gap is arranged between facing ends of inner segments of the magnetic cores 83A and 83B.

An active filter circuit shown in FIG. 16A includes a coil assembly L11, a switching element (typically a transistor) Q11, a control circuit CONT 1, diodes D11 and D12, a capacitor C11, and resistors RL and R11.

The magnetic cores 83A and 83B and the coil assembly 81 (L11) incorporating the magnetic cores 83A and 83B in the active filter circuit include a film-like permanent magnet 91 in the air gap at the junction portion of the magnetic cores 83A and 83B. At least one coil 85 having at least one turn is wound around the magnetic cores 83A and 83B. The permanent magnet 91 applies a magnetic field in a direction opposite to a direction of the magnetic fields generated in the magnetic cores 83A and 83B when a coil current iL flows from an input terminal 1 in response to the conduction of the switching element (typically the transistor) Q1.

Figure 16C:
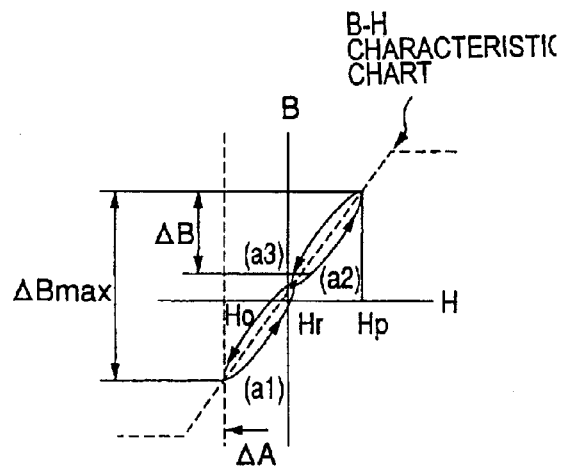
FIG. 16C illustrates operational B-H characteristics of the coil assembly incorporating the magnetic core shown in FIG. 16A.
Figure 16D:
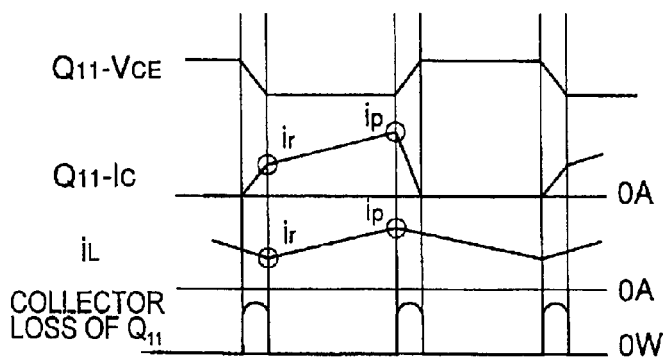
FIG. 16D is a waveform diagram of main waveforms in accordance with the operational B-H characteristics of the coil assembly shown in FIG. 16C.
Figure 16E:
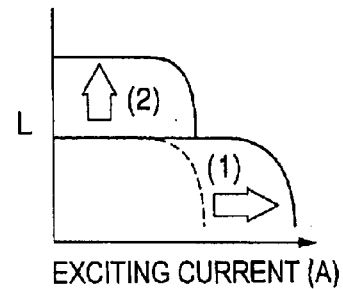
FIG. 16E is a diagram illustrating DC biased inductance of the coil assembly incorporating the magnetic core shown in FIG. 16A.

With the magnetic cores 83A and 83B and the coil assembly 20 (L11) of the present invention used, the film-like permanent magnet 91 biases the magnetic cores 83A and 83B by a ΔH toward the third quadrant in a direction opposite to a direction of the magnetic fields that are generated by a current flowing through the coil as shown in FIG. 16C. The permissible range ΔB of magnetic flux in response to the current and voltage applied to the coil is expanded as shown. The characteristics of the conventional coil assembly is represented by a dotted line as the DC biased inductance characteristic curve in response to an exciting current flowing through the coil in FIG. 16E. The magnetic cores 83A and 83B having the same inductance coefficient AL substantially increases superimposed current, given the same value of inductance, as represented by an arrow (1) in FIG. 16E. Conversely, if the AL value is increased by narrowing the air gap as represented by an arrow (2) in FIG. 16E, inductance is greatly increased, thereby assuring the conventional permissible superimposed current value.

When the magnetic core and the coil assembly 20 of the eighth embodiment of the present invention are applied to the coil assembly L11 of the active filter, the output power $P_o$(W) contributing to a voltage rise of the active filter is expressed by the following equation (4).

$$P_o = (1/2)L\{(ip)^2 - (ir)^2\}f \quad (4)$$

where f is an operational frequency, and ip and ir are peak values shown in FIG. 17D. Given the magnetic cores 83A and 83B having the same size and the same frequency, the output power is quadrupled because of the square law to an increase in the exciting current in equation (4).

Let Ve represent an effective volume of the magnetic cores 83A and 83B, k represent a proportionality factor, $\Delta B_{max}$ represent an exciting magnetic flux range, and equation (4) is rewritten as $$P_o = (k/2)(\Delta B_{max})^2 \cdot Ve \cdot f$$

The magnetic core is reduced in volume while a high design value of ΔB is permitted. A decrease in copper loss resulting from the reduction of a number of turns provides a compact and highly efficient active filter in the switching power supply.

Ninth Embodiment

Figure 17A:
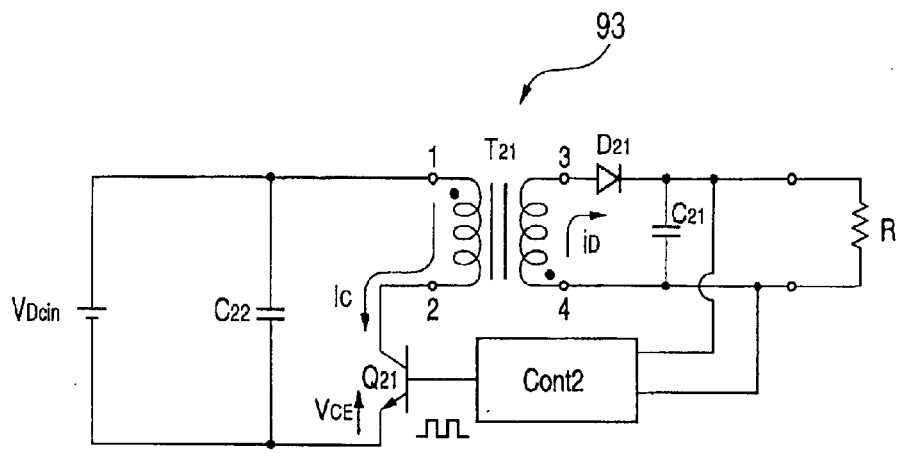
FIG. 17A is a circuit diagram illustrating a single-ended flyback DC-DC converter in accordance with a ninth embodiment of the present invention.

Referring to FIG. 17A, there are shown a transformer T21, a switching element (typically a transistor) Q21, a control circuit CONT 2, a diode D21, capacitors C21 and C22, and a resistor RL.

Figure 17B:
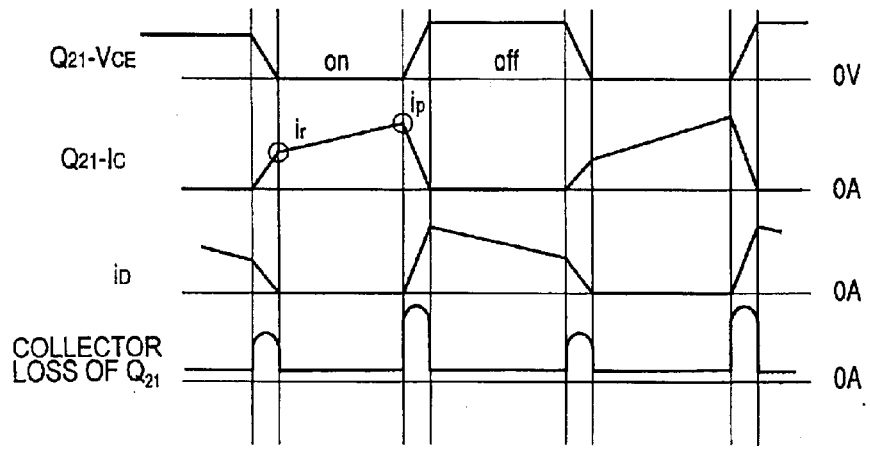
FIG. 17B is a waveform diagram of main waveforms in the operation of the single-ended flyback DC-DC converter shown in FIG. 17A.
Figure 17C:
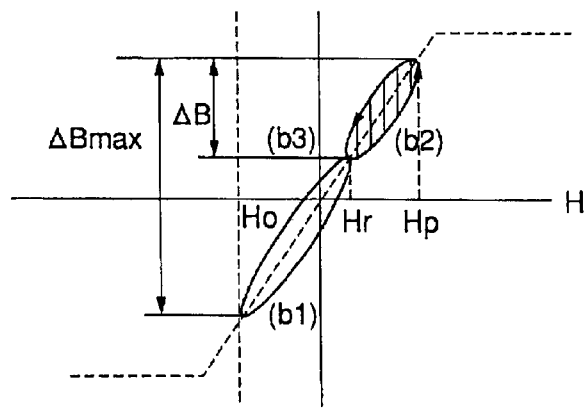
FIG. 17C illustrates operational B-H characteristics of the coil assembly incorporating the magnetic core shown in FIG. 17A.

The transformer T21 includes the magnetic core having the same construction as that of the eighth embodiment shown in FIG. 17B and includes an input coil 1-2 and an output coil 3-4. Inductance of the exciting coil is sufficiently high. When the switching element Q1 is turned on, a trapezoidal current flows through the exciting coil as shown in FIG. 2(b), while electromagnetic energy is charged. When the switching element Q1 is turned off, a trapezoidal output current flows through the output coil 3-4 and the diode D21. In this way, with the trapezoidal-wave output current flowing, power transfer is repeated in response to a command from the control circuit CONT 2.

Like in the first embodiment, the single-ended flyback type DC-DC converter 71 shown in FIG. 17A provides an output power $P_o$(W), where $$P_o = (1/2)L\{(ir)^2 - (ir)^2\} \cdot f$$

or $$P_o = (k/2)(\Delta B_{max})^2 \cdot Ve \cdot f$$

This arrangement eliminates the need for employing the conventional single-ended forward structure or the conventional full-bridge structure, known for its complex circuit arrangement, in a high-power DC-DC converter. A single-ended flyback type converter, which features high utilization of the transformer T21 and sufficiently reduces the root-mean-square value of a current flowing through the coil, implements simple, compact, and highly efficient designs without losing economical benefits.

Tenth Embodiment

Figure 18:
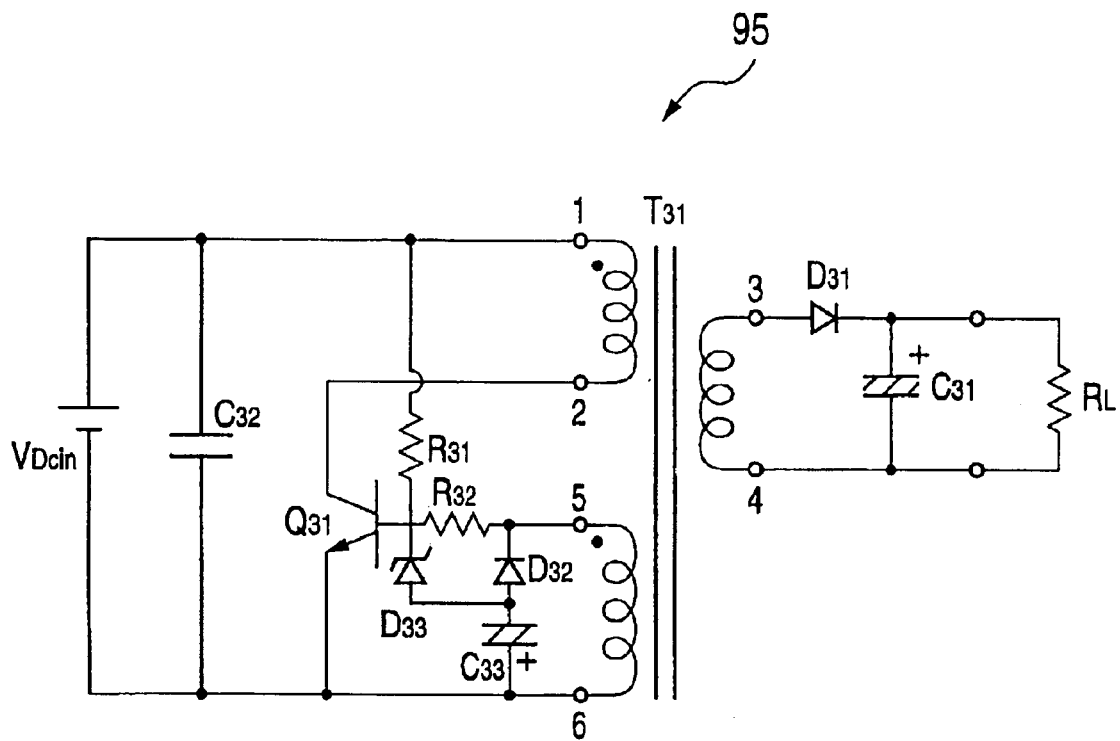
FIG. 18 is a circuit diagram illustrating a self-exciting RCC converter in accordance with a tenth embodiment of the present invention.

Referring to FIG. 18, there are shown a transformer T31, a switching element (typically a transistor) Q31, diodes D31, D32, and D33, capacitors C31, C32, and C33, and resistors R31, R32, and RL.

The transformer T31 includes a magnetic core having the same construction as that of the seventh embodiment shown in FIG. 17B, and the coil section of the transformer T31 includes an input coil 1-2, an output coil 3-4, and an auxiliary coil 5-6.

Since a permanent magnet is arranged in the transformer T31 to apply a bias magnetic field in a direction opposite to a direction of a magnetic field generated by a current flowing through the exciting coil 1-2, the output of the output coil 3-4 is transferred in a substantially larger quantity to the load than in the magnetic core and the coil assembly of the conventional art. This arrangement implements compact, high-power, and low-loss designs in the power supply.

Eleventh Embodiment

Figure 19A:
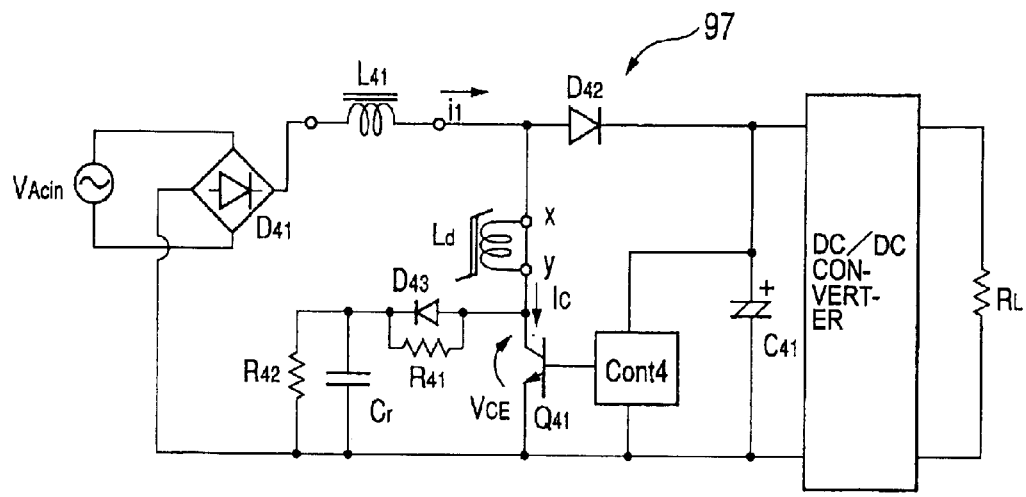
FIG. 19A is a circuit diagram showing a magnetic core, a coil assembly incorporating the magnetic core, and a power supply circuit incorporating the coil assembly in accordance with an eleventh embodiment of the present invention.
Figure 19B:
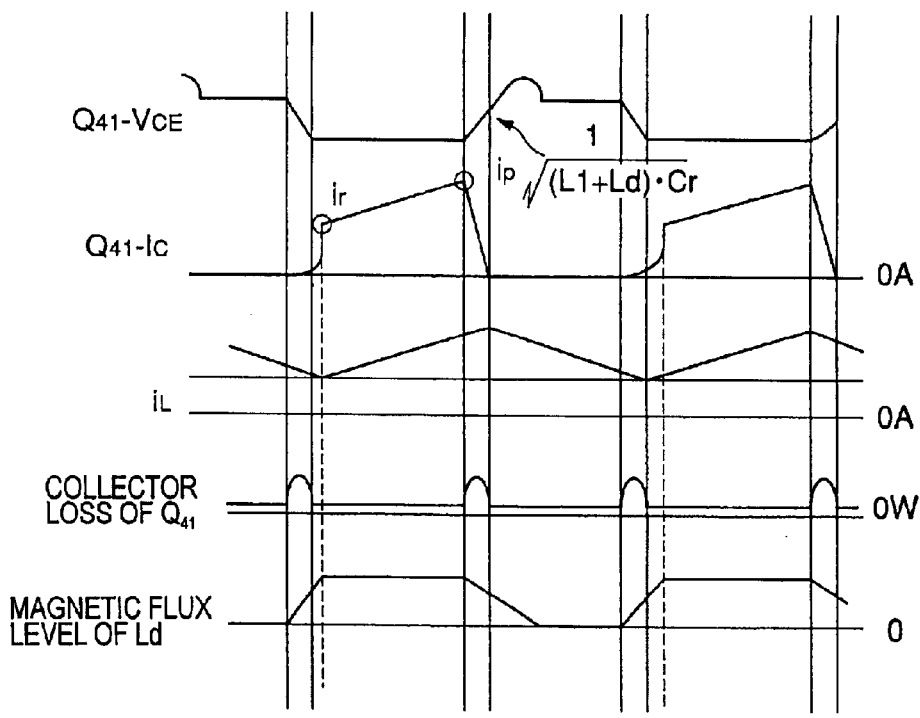
FIG. 19B is a waveform diagram showing main waveforms in the operation of the power supply circuit shown in FIG. 19A.

Referring to FIG. 19A, there are shown a reactor L41, a switching element (typically a transistor) Q41, a control circuit CONT 3, diodes D41, D42, and D43, capacitors Cr and C1, resistors RL, R41, and R42, and a saturable coil L6.

To achieve a high-output power supply, a trapezoidal-wave current, rather than a sawtooth-wave current, is allowed to flow through the switching element. This arrangement reduces the root-mean-square value of a current flowing through the reactor, thereby lowering loss involved in the reactor. But cross-current loss of the switching element itself increases at the turn-on of the switching element. For this reason, during the turn-on period of the switching element Q41, a coil x-y of a small number of turns is wound around a newly arranged, small magnetic core for a delay function forms the saturable coil Ld. The saturable coil Ld is serially connected between the exciting coil of the transformer and the switching element Q41. The capacitor Cr resonates in parallel with the switching element Q41 during the turn-off period of the switching element Q41.

During the turn-on period of the switching element Q41, the exciting current flows through the switching transistor Q41 with the saturable coil Ld in a non-saturated state. When the saturable coil Ld reaches a saturated state, the exciting current is conducted through the reactor L41. Cross-current loss becomes extremely small.

During the turn-off period of the switching element Q41, the sum of inductances of the reactor L41 and the saturable coil Ld and capacitance of the capacitor Cr starts parallel resonance through the diode D3. The voltage of the switching element Q41 rises under the condition of natural frequency $1/\{(L41+Ld)Cr\}1/2$. Cross-current loss equally becomes small.

The diode D43, connected in parallel with a resistor R43, is included in the parallel resonating circuit, and prevents an increase in cross-current loss by immediately discharging a charge stored in the capacitor Cr when the switching element Q41 is turned on.

The active filter receiving a utility power source voltage $V_{ACIN}$ must use a fast recovery diode for the diode D42. In the conventional art, the recover period of the diode D42 overlaps the turn-on period of the switching element Q41. A large penetrating current flows back from the output side to the switching element Q41, thereby reducing efficiency and causing strong EMI. The arrangement of the present invention blocks the penetrating current by the saturable reactor Ld. A high-efficiency and low-noise active filter results, presenting a large industrial benefit.

Twelfth Embodiment

Figure 20A:
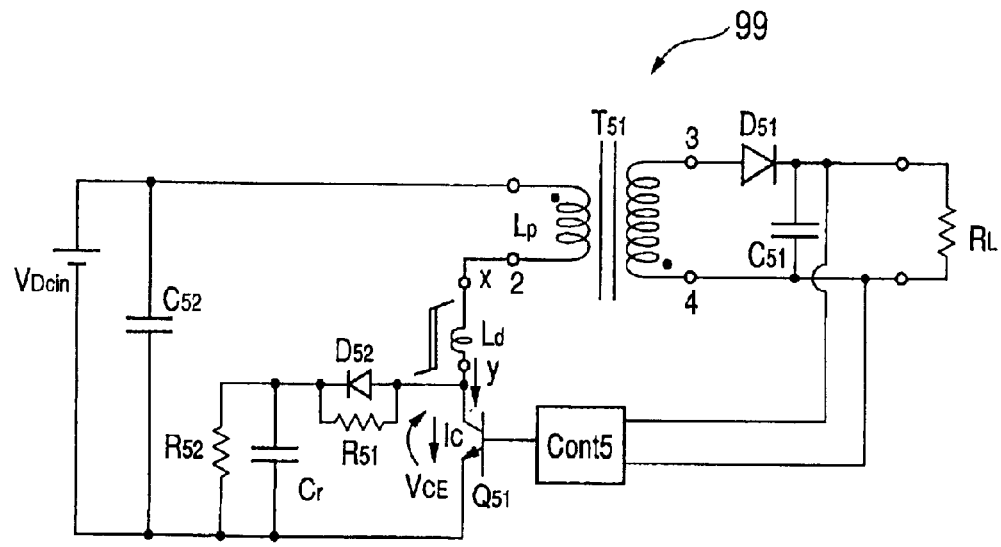
FIG. 20A is a circuit diagram showing a magnetic core, a coil assembly incorporating the magnetic core, and a power supply circuit incorporating the coil assembly in accordance with a twelfth embodiment of the present invention.
Figure 20B:
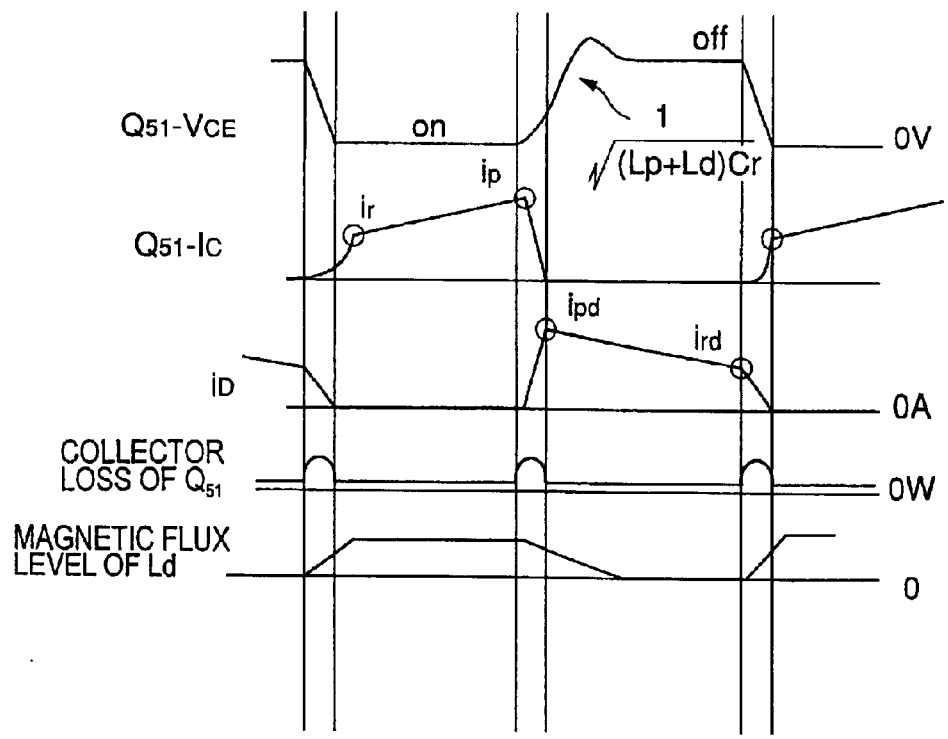
FIG. 20B is a waveform diagram of main waveforms in the operation of the power supply circuit shown in FIG. 20A.

Referring to FIG. 20A, there are shown a transformer T51, a switching element (typically a transistor) Q51, a control circuit Cont. 5, diodes D51 and D52, capacitors Cr, C51, and C52, resistors RL, R51, and R52, and a saturable coil Ld.

Even if a trapezoidal-wave current is used in the transformer to provide a high-output power supply in a twelfth embodiment like in the eleventh embodiment, a cross-current loss of the switching element Q51 is substantially reduced because the saturable coil Ld for delaying and the capacitor Cr for parallel resonance are arranged.

Discussed below are permanent magnets for biasing used for the magnetic core, and the coil assembly and the power supply circuit employing the magnetic core.

Thirteenth Embodiment

The following remedy is available as a solution to thermal demagnetization discussed as one of the problems of the conventional art. To withstand heat during reflow soldering, SmCo based magnetic particles having a high Tc are used. Thermal demagnetization is thus controlled.

One permanent magnet of the eighth embodiment having a temperature Tc of 770° C. and a conventional permanent magnet of Ba ferrite having a temperature Tc as low as 450° C. have been placed in a temperature-controlled chamber at 270° C., which is a typical temperature used in a reflow bath, for one hour, and have been left to cool down to ambient temperature. Results of the measurement of DC biased inductance characteristics are listed in table 1 below.

TABLE 1

| | L before reflowing (at 3A) | L after reflowing (at 3A) |
| --- | --- | --- |
| Eighth Embodiment (Tc 770° C.) | 11.5($\mu$H) | 11.4($\mu$H) |
| Ba ferrite (Tc 450° C.) | 11.5($\mu$H) | 7.0($\mu$H) |

The inductance assembly of the present invention using the high Tc material suffers from no change in the DC biased inductance characteristics before and after the reflow process. The conventional permanent magnet of Ba ferrite having a temperature Tc as low as 450° C. suffers from irreversible demagnetization due to heat. The conventional permanent magnet is thus degraded.

To resist heat through a reflow soldering process, magnetic particles must have a temperature Tc of 500° C. or higher.

From among SmCo based magnetic particles, magnetic particles such as a so-called third-generation $Sm_2Co_{17}$ magnet having the composition of $Sm(Co_{bal}Fe_{0.15-0.25}Cu_{0.05-0.06}Zr_{0.02-0.03})_{7.0-8.5}$ are used to further reduce thermal demagnetization.

One permanent magnet of the eighth embodiment having $Sm(Co_{0.742}Fe_{0.20}Cu_{0.055}Zr_{0.029})_{7.7}$ in the arrangement of the eighth embodiment and another permanent magnet of the eighth embodiment having $Sm(Co_{0.78}Fe_{0.11}Cu_{0.10}Zr_{0.01})_{7.7}$ in the arrangement of the eighth embodiment have been placed in a temperature-controlled chamber at 270° C., which is a typical temperature used in a reflow bath, for one hour, and have been left to cool down to ambient temperature. Results of the measurement of DC biased inductance characteristics are listed in table 2 below.

TABLE 2

| | L before reflowing (at 3A) | L after reflowing (at 3A) |
| --- | --- | --- |
| Eighth Embodiment $Sm(Co_{0.742}Fe_{0.20}Cu_{0.055}Zr_{0.029})_{7.7}$ | 11.5($\mu$H) | 11.4($\mu$H) |
| magnet of Eighth Embodiment $Sm(Co_{0.78}Fe_{0.11}Cu_{0.10}Zr_{0.01})_{7.7}$ | 11.2($\mu$H) | 7.0($\mu$H) |

The inductance assembly employing the permanent magnet having the third-generation composition $Sm(Co_{bal}Fe_{0.15-0.25}Cu_{0.05-0.06}Zr_{0.02-0.03})_{7.0-8.5}$ in accordance with the present invention suffers from no change in the DC biased inductance characteristics before and after the reflow process. The inductance assembly employing the permanent magnet having a so-called second generation $Sm_2CO_{17}$ suffers from degradation in DC bias inductance characteristic.

To resist heat through a reflow soldering process, magnetic particles must have the third-generation composition $Sm(Co_{bal}Fe_{0.15-0.25}Cu_{0.05-0.06}Zr_{0.02-0.03})_{7.0-8.5}$ in accordance with claim 6.

Fourteenth Embodiment

The following remedy is available as a solution to demagnetization due to excess current as one of the problems of the conventional art. SmCo based magnetic particles having a high iHc are used for the permanent magnet not to lose coercive force thereof.

An excess current of 300A having a duration of 50 $\mu$s has been applied to two circuits of the eighth embodiment, one including a permanent magnet in the eighth embodiment having a coercive force of 20 kOe (1.58 MA/m) and the other including a conventional permanent magnet having a coercive force of 2 kOe (158 kA/m), both arranged in the construction of the eighth embodiment. Table 3 lists results of the measurement of DC biased inductance characteristics.

TABLE 3

| | L before application of electric current (at 3A) | L after application of electric current (at 3A) |
|---|---|---|
| Eighth Embodiment (coercive force 20kOe; 1.58 MA/m) | 11.5($\mu$H) | 11.4($\mu$H) |
| Ba ferrite magnet (coercive force 2kOe; 158 kA/m) | 11.5($\mu$H) | 8.0($\mu$H) |

The inductance assembly of the present invention using a high iHc suffers from no change in the DC biased inductance characteristics before and after the application of the excess current. The inductance assembly formed of the Ba ferrite magnet having a coercive force as low as 2 kOe (158 kA/m) is demagnetized by a magnetic field applied in a direction opposite to a direction of the magnetic field of the permanent magnet.

To withstand a DC magnetic field due to an excess current, magnetic particles having a coercive force of 10 kOe (790 kA/m) or larger must be used.

Fifteenth Embodiment

The following remedy is available as a solution to permanent demagnetization due to oxidation that is in progress with time in the conventional art. To protect the magnetic particles from oxidation, the magnetic particles are coated with a metal or an alloy.

One permanent magnet having the coating of Zn and the other permanent magnet having no coating of Zn, both in the arrangement of the eighth embodiment, were immersed in salt water, and thereafter left in the atmosphere for 200 hours, and DC biased inductance characteristics thereof were measured. Table 4 lists results of the measurement.

TABLE 4

| | L before left in the atmosphere (at 3A) | L after left in the atmosphere (at 3A) |
|---|---|---|
| Eighth Embodiment (with Zn coating) | 11.5($\mu$H) | 11.4($\mu$H) |
| magnet powder of First Embodiment (without Zn coating) | 11.5($\mu$H) | 10.3($\mu$H) |

The inductance assembly with the coating of the present invention suffers from no change in DC biased inductance characteristics before and after PCT. The inductance assembly including the magnetic particles having no Zn coating is demagnetized as oxidation is in progress with time. The DC biased inductance characteristics thereof are thus degraded.

To control permanent demagnetization due to oxidation, the magnetic particles are coated with Zn, Al, Bi, Ga, In, Mg, Pb, Sb, Sn, or the like.

If the mean particle diameter of the magnetic particles falls within a range of from 2.5 to 25 $\mu$m with a maximum diameter of 50 $\mu$m, oxidation during manufacturing process is also controlled.

DC biased inductance characteristics have been measured on one circuit of the eighth embodiment including a permanent magnet formed of magnetic particles having mean particle diameter as long as 5 $\mu$m with the maximum diameter thereof being 45 $\mu$m and the other circuit of the eighth embodiment including a permanent magnet formed of magnetic particles having mean particle diameter as long as 2 $\mu$m. Table 5 lists results of the measurement.

TABLE 5

| | Inductance Value (at 3A) |
|---|---|
| Eighth Embodiment mean particle diameter 5 $\mu$m maximum particle diameter 45 $\mu$m magnetic particles | 11.5($\mu$H) |
| mean particle diameter 2 $\mu$m maximum particle diameter 45 $\mu$m | 8.35($\mu$H) |

The inductance assembly having the particle diameter of the present invention results in a 50% improvement in the DC biased inductance characteristics due to magnetic bias. The inductance assembly including the magnetic particles having particle diameter of 2 $\mu$m results in only a 15% improvement.

To control oxidation during a manufacturing process, the mean particle diameter needs to fall within a range of from 2.5 to 25 $\mu$m with the maximum particle diameter being set to 50 $\mu$m.

Sixteenth Embodiment

The following remedy is available as a solution to an increase in core loss due to a low specific resistivity as one of the problems of the conventional art. To achieve a high resistivity, the volume percent of a resin is set to be 30% or more.

Core loss has been measured on one arrangement of the eighth embodiment including a permanent magnet having a resin content of 40 volume percent and a specific resistivity of 0.5 $\Omega$·cm, a second arrangement of the eighth embodiment including a permanent magnet having a resin content of 20 volume percent and a specific resistivity of 0.05 $\Omega$·cm, and a third arrangement of the eighth embodiment including a permanent magnet having a resin content of 30 volume percent and a specific resistivity of 0.1 $\Omega$·cm. Table 6 lists results of the measurement.

TABLE 6

| | specific resistivity ($\Omega$ · cm) | core loss (kW/m$^3$) (at 300 kHz, 100 mT) |
|---|---|---|
| Eighth Embodiment (resin content 40 vol %) | 0.5 | 515 |
| magnetic particles used in Eighth Embodiment (resin content 20 vol %) | 0.05 | 1230 |
| magnetic particles used in Eighth Embodiment (resin content 30 vol %) | 0.1 | 530 |

The inductance assembly including a resin content of 20 volume percent and having a specific resistivity as low as 0.05 $\Omega$·cm suffers from more core loss because of an eddy current than the core loss of the inductance assembly which includes a resin content of 30 volume percent in accordance with the present invention. The inductance assembly including a resin content of 30 volume percent and having a specific resistivity of 0.1 $\Omega$·cm is subject to a core loss comparable to that of the first embodiment which includes a resin content of 40 volume percent and having a specific resistivity of 0.5 $\Omega$·cm.

To control an increase in the core loss due to a drop in specific resistivity, the resin content must be 30 volume percent or more and the specific resistivity must be 0.1 $\Omega$·cm or more.

In accordance with the eighth through sixteenth embodiments of the present invention, the coil assembly, such as a magnetic core, a choke coil, or a transformer, used in a switching power supply becomes substantially compact and has a low-loss property, if the magnetic core, and the coil assembly and the power supply circuit employing the magnetic core are used. The power supply circuit is particularly advantageous in industrial applications because of simple construction, high efficiency, resource-saving, and highly reliable features thereof.

What is claimed is:

1. A magnetic core having an open magnetic path, comprising a magnetic body and a permanent magnet, said magnetic body forming the open magnetic path and having a soft magnetic property, said permanent magnet being provided at least at one end of the open magnetic path of the magnetic body.

2. A magnetic core according to claim 1, wherein the magnetic body comprises an air gap at least at one location of the magnetic path, the permanent magnet having a specific resistivity of 1 Ω·cm or more and an intrinsic coercive force of 395 kA/m or more being arranged in the air gap.

3. A magnetic core according to claim 2, wherein the permanent magnet is a bonded magnet which contains rare-earth magnetic particles and a binder formed of a synthetic resin.

4. A magnetic core according to claim 3, wherein the rare-earth magnetic particles used in the bonded magnet have a diameter of 150 μm or less.

5. A magnetic core according to claim 4, wherein the rare-earth magnetic particles have an intrinsic coercive force of 790 kA/m or more, a temperature Tc of 500° C. or higher, and particle mean diameter falling within a range of from 2.5 to 25 μm.

6. A magnetic core according to claim 3, wherein the composition of the rare-earth magnetic particles is $Sm(Co_{bal}Fe_{0.15-0.25}Cu_{0.05-0.06}Zr_{0.02-0.03})_{7.0-8.5}$.

7. A magnetic core according to claim 3, wherein the volume percentage of the synthetic resin to the permanent magnet is 30% or more.

8. A magnetic core according to claim 3, wherein the synthetic resin comprises at least one resin selected from the group consisting of a polyamide-imide resin, a polyimide resin, an epoxy resin, a polyphenylene sulfide resin, a silicone resin, a polyester resin, an aromatic polyamide resin, and a liquid-crystal polymer.

9. A magnetic core according to claim 3, wherein the rare-earth magnetic particles are coated with at least one metal or the alloy of the one metal selected from the group consisting of Zn, Al, Bi, Ga, In, Mg, Pb, Sb, and Sn.

10. A magnetic core according to claim 9, wherein the metal or the alloy thereof coating the rare-earth magnetic particles is in turn coated with a non-metallic inorganic compound having a melting point of 300° C. or higher.

11. A magnetic core according to claim 10, wherein the content of the coating for the rareearth magnetic particles, including the metal or the alloy thereof, inorganic glass, a metal or an alloy thereof, and the non-metallic inorganic compound having a melting point of 300° C. or higher is in an amount from 0.1 to 10 volume percent.

12. A magnetic core according to claim 3, wherein the rare-earth magnetic particles are coated with inorganic glass having a softening point falling within a range of from 220° C. to 550° C.

13. A magnetic core according to claim 12, wherein the content of the coating for the rare-earth magnetic particles, including the metal or the alloy thereof, inorganic glass, a metal or an alloy thereof, and a non-metallic inorganic compound having a melting point of 300° C. or higher is in an amount from 0.1 to 10 volume percent.

14. A magnetic core according to claim 3, wherein when the permanent magnet is manufactured, the rare-earth magnetic particles are made magnetically anisotropic by aligning the magnetic particles in the direction of thickness of the core in a magnetic field.

15. A magnetic core according to claim 2, wherein a magnetizing magnetic field of the permanent magnet is 2.5 T or more in strength.

16. A magnetic core according to claim 2, wherein the mean irregularity Ra of the center line of the permanent magnet is 10 μm or less in the magnetic core.

17. A coil assembly comprising:
   a magnetic core having an open magnetic path and comprising a magnetic body, said magnetic body forming the open magnetic path and having a soft magnetic property;
   a permanent magnet at least at one end of the magnetic path of the magnetic body; and
   at least one coil having at least one turn wound around the magnetic core.

18. A coil assembly according to claim 17, wherein the magnetic body comprises an air gap at least at one location of the magnetic path, the permanent magnet having a specific resistivity of 1 Ω·cm or more and an intrinsic coercive force of 395 kA/m or more and being arranged in the air gap.

19. A coil assembly according to claim 18, wherein the permanent magnet is a bonded magnet containing rare-earth magnetic particles and a binder formed of a synthetic resin.

20. A coil assembly according to claim 19, wherein the rare-earth magnetic particles used in the bonded magnet have a diameter of 150 μm or less.

21. A coil assembly according to claim 20, wherein the rare-earth magnetic particles have an intrinsic coercive force of 790 kA/m or more, a temperature Tc of 500° C. or higher, and particle diameter mean falling within a range of from 2.5 to 25 μm.

22. A coil assembly according to claim 19, wherein the composition of the rare-earth magnetic particles is $Sm(Co_{bal}Fe_{0.15-0.25}Cu_{0.05-0.06}Zr_{0.02-0.03})_{7.0-8.5}$.

23. A coil assembly according to claim 19, wherein the volume percentage of the synthetic resin to the permanent magnet is 30% or more.

24. A coil assembly according to claim 19, wherein the synthetic resin comprises at least one resin selected from the group consisting of a polyamide-imide resin, a polyimide resin, an epoxy resin, a polyphenylene sulfide resin, a silicone resin, a polyester resin, an aromatic polyamide resin, and a liquid-crystal polymer.

25. A coil assembly according to claim 19, wherein the rare-earth magnetic particles are coated with at least one metal or the alloy of the one metal selected from the group consisting of Zn, Al, Bi, Ga, In, Mg, Pb, Sb, and Sn.

26. A coil assembly according to claim 25, wherein the metal or the alloy thereof coating the rare-earth magnetic particles is in turn coated with a non-metallic inorganic compound having a melting point of 300° C. or higher.

27. A coil assembly according to claim 25, wherein the content of the coating for the rare-earth magnetic particles, including the metal or the alloy thereof, inorganic glass, a metal or an alloy thereof, and the non-metallic inorganic compound having a melting point of 300° C. or higher is in an amount from 0.1 to 10 volume percent.

28. A coil assembly according to claim 19, wherein the rare-earth magnetic particles are coated with inorganic glass having a softening point falling within a range of from 220° C. to 550° C.

29. A coil assembly according to claim 28, wherein the content of the coating for the rare-earth magnetic particles, including the metal or the alloy thereof, inorganic glass, a metal or an alloy thereof, and the non-metallic inorganic compound having a melting point of 300° C. or higher is in an amount from 0.1 to 10 volume percent.

30. A coil assembly according to claim 18, wherein when the permanent magnet is manufactured, the rare-earth magnetic particles are made magnetically anisotropic by aligning the magnetic particles in the direction of thickness of the core in a magnetic field.

31. A coil assembly according to claim 18, wherein a magnetizing magnetic field of the permanent magnet is 2.5 T or more in strength.

32. A coil assembly according to claim 18, wherein the mean irregularity Ra of the center line of the permanent magnet is 10 μm or less in the magnetic core.

33. A power supply circuit comprising a coil assembly, the coil assembly comprising:
a magnetic core having an open magnetic path and comprising a magnetic body forming the open magnetic path and having a soft magnetic property;
a permanent magnet at least at one end of the magnetic path of the magnetic body; and
at least one coil having at least one turn wound around the magnetic core,
wherein a magnetic field is generated in response to an exciting current that flows through the coil of the coil assembly when an input voltage is applied and is applied to the magnetic body having the soft magnetic property, said magnetic field being opposite in direction to a magnetic field which is applied to the magnetic body having the soft magnetic property by the permanent magnet.

34. A power supply circuit according to claim 33, further comprising at least one magnetic core, wherein at least one coil is formed around at least the one magnetic core, both ends of the coil of at least the one magnetic core are serially connected between the coil and a switching element to the input voltage, and a circuit containing at least one capacitor is connected in parallel with the switching element.

35. A power supply circuit according to claim 33, wherein the magnetic body comprises an air gap at least at one location of the magnetic path, and the permanent magnet having a specific resistivity of 1 Ω·cm or more and an intrinsic coercive force of 395 kA/m or more is arranged in the air gap.

36. A power supply circuit according to claim 35, wherein the permanent magnet is a bonded magnet which contains rare-earth magnetic particles and a binder formed of a synthetic resin.

37. A power supply circuit according to claim 36, wherein the rare-earth magnetic particles used in the bonded magnet have a diameter of 150 μm or less.

38. A power supply circuit according to claim 35, wherein the rare-earth magnetic particles have an intrinsic coercive force of 790 k/Am or more, a temperature Tc of 500° C. or higher, and particle mean diameter falling within a range of from 2.5 to 25 μm.

39. A power supply circuit according to claim 36, wherein the composition of the rare-earth magnetic particles is $Sm(Co_{bal}Fe_{0.15-0.25}Cu_{0.5-0.06}Zr_{0.02-0.03})_{7.0-8.5}$.

40. A power supply circuit according to claim 36,
wherein the volume percentage of the synthetic resin to the permanent magnet is 30% or more, and
wherein the synthetic resin comprises at least one resin selected from the group consisting of a polyamide-imide resin, a polyimide resin, an epoxy resin, a polyphenylene sulfide resin, a silicone resin, a polyester resin, an aromatic polyamide resin, and a liquid-crystal polymer.

41. A power supply circuit according to claim 36, wherein the rare-earth magnetic particles are coated with at least one metal or the alloy of the one metal selected from the group consisting of Zn, Al, Bi, Ga, In, Mg, Pb, Sb, and Sn.

42. A power supply circuit according to claim 41, wherein the metal or the alloy thereof coating the rare-earth magnetic particles is in turn coated with a non-metallic inorganic compound having a melting point of 300° C. or higher.

43. A power supply circuit according to claim 41, wherein the content of the coating for the rare-earth magnetic particles, including the metal or the alloy thereof, inorganic glass, a metal or an alloy thereof, and the non-metallic inorganic compound having a melting point of 300° C. or higher is in an amount from 0.1 to 10 volume percent.

44. A power supply circuit according to claim 36, wherein the rare-earth magnetic particles are coated with inorganic glass having a softening point falling within a range of from 220° C. to 550° C.

45. A power supply circuit according to claim 44, wherein the content of the coating for the rare-earth magnetic particles, including the metal or the alloy thereof, inorganic glass, a metal or an alloy thereof, and a non-metallic inorganic compound having a melting point of 300° C. or higher, is in an amount from 0.1 to 10 volume percent.

46. A power supply circuit according to claim 35, wherein when the permanent magnet is manufactured, the rare-earth magnetic particles are made magnetically anisotropic by aligning the magnetic particles in the direction of thickness of the core in a magnetic field.

47. A power supply circuit according to claim 35, wherein a magnetizing magnetic field of the permanent magnet is 2.5 T or more in strength.

48. A power supply circuit according to claim 35, wherein the mean irregularity Ra of the center line of the permanent magnet is 10 μm or less in the magnetic core.

* * * * *